(12) United States Patent
Casadei

(10) Patent No.: US 7,738,705 B2
(45) Date of Patent: Jun. 15, 2010

(54) HIERARCHICAL METHOD AND SYSTEM FOR PATTERN RECOGNITION AND EDGE DETECTION

(76) Inventor: Stefano Casadei, 34 William St., Cambridge, MA (US) 02139

( * ) Notice: Subject to any disclaimer, the term of this patent is extended or adjusted under 35 U.S.C. 154(b) by 1198 days.

(21) Appl. No.: 11/167,042

(22) Filed: Jun. 23, 2005

(65) Prior Publication Data

US 2006/0002609 A1 Jan. 5, 2006

Related U.S. Application Data

(60) Provisional application No. 60/584,049, filed on Jun. 30, 2004, provisional application No. 60/675,887, filed on Apr. 29, 2005.

(51) Int. Cl.
*G06K 9/36* (2006.01)
(52) U.S. Cl. .................. 382/181; 382/191; 382/282; 382/305
(58) Field of Classification Search ................ 382/187, 382/190, 209, 219, 278
See application file for complete search history.

(56) References Cited

U.S. PATENT DOCUMENTS

| | | | |
|---|---|---|---|
| 4,771,469 A | 9/1988 | Wittenburg | |
| 5,170,440 A | 12/1992 | Cox | |
| 5,210,799 A | 5/1993 | Rao | |
| 5,881,170 A | 3/1999 | Araki et al. | |
| 5,933,529 A | 8/1999 | Kim | |
| 5,987,172 A | 11/1999 | Michael | |
| 6,408,109 B1 | 6/2002 | Silver et al. | |
| 6,430,551 B1 * | 8/2002 | Thelen et al. | 707/3 |
| 6,584,221 B1 * | 6/2003 | Moghaddam et al. | 382/165 |
| 6,690,842 B1 | 2/2004 | Silver et al. | |
| 6,753,965 B2 * | 6/2004 | Kumar et al. | 356/431 |
| 7,142,693 B2 * | 11/2006 | Zhang et al. | 382/100 |
| 7,165,174 B1 * | 1/2007 | Ginter et al. | 713/153 |

OTHER PUBLICATIONS

Ulf Grenander. Foundations of Pattern Analysis. Quarterly of Applied Math. vol. 27, No. 1, Apr. 1969.
Song_Chun Zhu. Statistical Modeling and Conceptualization of Visual Patterns. IEEE Trans. on PAMI. vol. 25, No. 6, Jun. 2003.
Karl Rohr. Recognizing Corners by Fitting Parametric Models. Intl. J. of Computer Vision, 9:3. 1992.

(Continued)

*Primary Examiner*—Yosef Kassa
(74) *Attorney, Agent, or Firm*—Stefano Casadei

(57) ABSTRACT

A method and a system for pattern recognition utilizes an ensemble of reference patterns to represent the possible instances of the models to be recognized; constructs a hierarchy of estimators to simplify and enhance the recognition of the models of interest; approximates complex reference patterns with linear compositions of simpler patterns; fragments complex patterns into local patterns so that interference between the local patterns is sufficiently small for linearization methods to be applicable; constructs estimators during an offline stage to offload calculations from the online signal processing stage; designs model estimators based on optimization principles to enhance performance and to provide performance metrics for the estimated model instances; generates a hierarchy of reference descriptors during the offline stage, which are used for the design and construction of the model estimators. Specific examples are provided for the recognition of image features such as edges and junctions.

20 Claims, 6 Drawing Sheets

OTHER PUBLICATIONS

Baker, Nayar, Murase. Parametric Feature Detection. Intl J of Computer Vision, 27(1), 1998.
Baker, Nayar, Murase. Parametric Feature Detection. IEEE Conf on CVPR, 1996, p. 471-477.
Deriche, Blaszka. Recovering and characterizing image features using an efficient model based approach. IEEE Conf. on CVPR, 1993.
Blaszka, Deriche, Recovering and characterizing image features using an efficient model based approach. INRIA n 2422, Nov. 1994.
Blaszka, Deriche, A model based method for characterization and location of curved image features. INRIA n 2451, Dec. 1994.
Parida, Geiger Junctions: Detection, Classification, and reconstruction. IEEE Trans. on PAMI. vol. 20, No. 7, Jul. 1998.
Haralick Digital step of edges from zero crossing of second directional derivatives. IEEE Trans. on PAMI. vol. 6, No. 1, Jul. 1984.
Nalwa, BinFord. On Detecting Edges. IEEE Trans. on PAMI, 8:6, Nov. 1986.
Casadei. Robust Detection of Curves in Images. PhD Thesis, MIT, May 1995.
Casadei, Mitter. Hierarchical Curve Reconstruction. Part 1: Bifurcation Analysis and Recovery of Smooth Curves: Lecture Notes in Computer Science, v 1064, 1996, p. 199.
Casadei, Mitter. An efficient and provably correct algorithm for the multiscale estimation of image contours by means of polygonal lines. IEEE Trans. on Inf. T, 45:3, 1999.
Casadei, Mitter. Beyond the uniqueness assumption: ambiguity representation and redundancy elimination of . . . cycles. Computer Vision and Im Underst. 76:1, Oct. 1999.
Casadei, Mitter. Hierarchical image segmentation—Part I: Detection of regular curves in a vector graph. Intl J of Computer Vision, 27:1, 1998.
Parent, Zucker. Trace Inference, Curvature Consistency, and Curve Detection. IEEE Trans. of PAMI. 11:8, Aug. 1989.
Zucker, David, Dobbins and Iverson. The organization of Curve Detection: Coarse Tangent Fields and fine spline coverings. Intl Conf Comp Vision, 1989.
Zucker, Dobbins and Iverson. Two Stages of Curve Detection Suggest Two Styles of Visual Computation. Neural Computation, 1. 1989.
Elder Krupnik and Johnston. Contour Grouping with Prior Models. IEEE Trans on PAMI, 25:6. Jun. 2003.
Elder and Zucker Computing Contour Closure. European Conf on Computer Vision, 1996, vol. 1.
Cravier. A probabilistic Method for Extracting Chains of Collinear Segments. Computer Vision and Image Understanding, 76:1. Oct. 1999.
Sarkar and Boyer. Perceptual Organization in Computer Vision: A Review and a Proposal for a Classification Structure. IEEE Trans. on Systems, Man and Cybern. 23:2. 1993.
Sarkar and Boyer. A Computational Structure for Preattentive Perc. Organization: Graphical Enumeration and Voting Methods. IEEE Trans. on Systems, Man and Cyb. 24:2, 1994.
Mi-Suen Lee and Medioni. Grouping . . . into Regions, Curves and Junctions. Computer Vision and Image Understanding, 76:1, Oct. 1999.
Guy and Medioni. Inferring Global Perceptual Contours from Local Features. Intl J of Computer Vision, 20(1/2), 1996.
Saund. Labeling of Curvilinear Structure across Scales by Token Grouping. Intl Conf Computer Vision, 1992.
Saund. Perceptual Organization of Occluding Contours of Opaque Surfaces. Computer Vision and Image Understanding, 76:1. Oct. 1999.
Hancock and Kittler Edge-labeling Using Dictionary-Based Relaxation. IEEE Trans. on PAMI, 12:2 Feb. 1990.
Matalas, Benjamin and Kitney. An Edge Detection Technique Using the Facet Model and Parameterized Relaxation Labeling. IEEE T. on PAMI, 19:4, Apr. 1997.
Bienenstock, Geman and Potter Compositionality, MDL Priors, and Object Recognition. Adv in Neural Inf Proc Sys 9, 1997.
Steger. Removing the Bias from Line Detection, CVPR 1997.
Steger. An Unbiased Detector of Curvilinear Structures. PAMI 20:2, Feb. 1998.
Steger. Extracting Curvilinear Structures: A Differential Geometry Approach. Europ Conf on Computer Vision, 1996.
Steger. Extraction of curved lines from images, ICCV, 1996.
Steger. Evaluation of Subpixel Line and Edge Detection Precision and Accuracy.
Iverson and Zucker Logical/Linear Operators for Image Curves. PAMI, 17:10, Oct. 1995.
Kothe Integrated Edge and Junction Detection with the Boundary Tensor, ICCV, 2003.
Malik, Belongie, Shi, and Leung. Textons, Contours, and Regions: Cue Integration in Image Segmentation. ICCV, 1999.
Bergaud and Mallat. Matching Pursuit of Images. SPIE vol. 2491, 1995.
Mallat and Zhang. Matching Pursuits with Time-Frequency Dictionaries. IEEE Trans. on Signal Proc. 41:12, Dec. 1993.
Donoho. Wedgelets: Nearly-Minimax Estimation of Edges. Presented at "Asymptotic Methods in Stochastic Dynamics and Nonparam stat.", Humboldt U, Berlin, Sep. 2-4, 1996.
Romberg, Wakin, and Baraniuk. Multiscale wedgelet image analysis: fast decompositions and modeling. IEEE Intl Conf on Image Processing, 2002.
Coifman and Wickerhauser. Entropy-based Algorithms for Best Basis Selection. IEEE Trans on Info. Th. 38:2p2, Mar. 1992.
Donoho. Can recent innovations in harmonic analysis "explain" key findings in natural image statistics? Network: Computation in Neural Systems, v 12, n 3, Aug. 2001, p. 371-93.
Chen, Donoho, and Saunders. Atomic Decomposition by Basis Pursuit. SIAM Review, v 43, n 1, 2001, p. 129-59.
Rebollo-Neira. Backward Adaptive Biorthogonalization. IEEE Signal Processing Letters, v 11, n 9, Sep. 2004, p. 705-708.
Fergus, Perona and Zissermann. A Sparse Object Category Model for Efficient Learning and Exhaustive Recognition.
Helmer and Lowe. Object class Recognition with many Local Features.
Mohan, Papageorgiou and Poggio. Example-based Object Detection in Images by Components. PAMI, 23:4, Apr. 2001.
Selinger and Nelson. A Perceptual Grouping Hierarchy for Appearance-Based 3D Object Recognition. Computer Vision and Image Understanding, 76:1. Oct. 1999.
Singh, Arora and Ahuja. A Robust Probabilistic Estimation Framework for Parametric Image Models.
Guo, Zhu, and Wu. Towards a Mathematical Theory of Primal Sketch and Sketchability. ICCV 2003.
Nitzberg and Mumford. The 2.1 Sketch. ICCV 1990.
Brooks, Chojnacki, Gawley and Van Den Hengel. What value covariance information in estimating vision parameters? ICCV, 2001.
Zhou, Comaniciu and Krishnan. Conditional feature sensitivity: a unifying view on active recognition and feature selection. ICCV, 2003.

* cited by examiner

HIERARCHICAL METHOD AND SYSTEM FOR PATTERN RECOGNITION AND EDGE DETECTION

REFERENCE TO RELATED APPLICATIONS

This application claims the benefit of U.S. Provisional Patent Application 60/584,049, filed Jun. 30, 2004, entitled "System and method to generate picture notes"; and U.S. Provisional Patent Application 60/675,887, filed Apr. 29, 2005, entitled "System and method for model recognition and feature extraction", both by the same inventor.

FIELD OF THE INVENTION

This invention relates to the fields of signal processing, image processing, pattern recognition, and machine vision. More specifically, this invention relates to methods and systems for recognizing patterns and for extracting features including edges, corners, junctions, salient points, etc.

BACKGROUND OF THE INVENTION

In this disclosure, the term "pattern recognition" refers to the detection, estimation and classification of entities useful for performing a task. These entities may include high-level task-dependent objects such as roads, cars and faces; generic low-level features, such as edges; and any other auxiliary or intermediate entity that may be useful for recognizing a more complex object, such as an object part or a combination of low level features. Some examples of existing pattern recognition and edge detection inventions are disclosed in European Patents 1,488,410 and 1,394,727; U.S. Pat. No. 6,690,842; and WO 2005/010803. While the exemplary embodiments described in this disclosure relate mostly to the recognition of edge features in images, those skilled in the art will appreciate how the disclosed invention can be utilized to recognize other types of features and objects. If a pattern recognition method relies on a model of the entity of interest, which is the most common situation, then the term "model recognition" is also used, with intended meaning comprising "pattern recognition" and "feature extraction".

Linear Methods vs. Model-Based Optimization Methods

Several methods for pattern recognition are based on convolution and linear filtering. For example, a pattern can be sought by convolving the signal with a suitable matched filter and by searching for peaks in the filter's response. Many edge detectors are based on a strategy of this kind and utilize a plurality of filters, such as Gaussian filters, to smooth the image before searching for the edges [28, 18].

While this approach is computationally efficient, it is known to lead to inaccurate estimates of important parameters such as the location of edges and the width of lines [17, 31]. One solution to this problem is to analyze these inaccuracies and design ad-hoc compensators [31]. Another strategy, which attains better accuracy and detection performance and is applicable to a more general class of problems, is to provide a parametric model of the feature or object and to use an optimization method, such as the Levenberg-Marquardt or the Gauss-Newton algorithms, to estimate the optimal model parameter [16, 29].

A disadvantage of many existing optimization methods is their high computational requirements. Dimensionality reduction techniques such as the Karhunen-Loéve expansion [12], or the sparse Levenberg-Marquardt algorithm [3] have been proposed to address this issue. Another related disadvantage of most existing optimization methods is that intermediate results are typically not stored; hence, calculations performed for one signal block can not be reutilized to aid the processing of another signal block or to search for multiple model instances.

Hierarchical and Compositional Methods

Another important well-known pattern recognition methodology is to exploit the whole-part structure of a model and to adopt a divide-and-conquer strategy. A complex model can be decomposed into parts, these parts into smaller parts, etc., thus yielding a hierarchy of submodels. See for example European Patents 1,488,410 and 1,394,727; WO 2005/010803, and WO 2005/010819.

In some of these hierarchical methods, recognized instances of the complex models are obtained by composing recognized instances of its parts. A critical and computationally difficult aspect of this "compositional" approach is to identify the groups of parts that must be composed together. Typically, this grouping process is based on local relationships and constraints between the parts. For example, edge points can be linked into edge segments based on their collinearity and vicinity. Some detection and linking methods for edges and contours are described in: [13, 14, 15] [4] [5, 6] [7].

The fastest grouping methods are those based on a "greedy" strategy. These methods perform a single sequential scan through the parts and determine which neighbors a part should be grouped with based solely on local properties. Relaxation schemes are more sophisticated methods that update grouping variables iteratively until overall consistency or some other criterion is maximized [27, 19, 25, 21]. Another strategy for grouping parts is to perform a global optimization based on the total intra-similarity and inter-dissimilarity between the groups, for example, by means of a graph partitioning method [30].

Another strategy for recognizing models composed of parts (European Patents 1,488,410 and 1,394,727; WO 2005/010803) is to select a particular part to serve as "anchor"; to detect an instance of the selected anchor in the input signal; and then to search for additional parts or anchors in a region constrained by the detected anchor or anchors. These methods are particularly useful for recognizing complex objects, especially non-rigid objects whose part may form loosely constrained configurations.

Methods Based on Segmentation

Some methods to exploit compositional structure are based on an initial segmentation stage which segments the input signal into homogeneous regions corresponding to model parts before performing model recognition. A major well-known disadvantage of these methods is that the boundaries of homogeneous regions do not always correspond to the boundaries of the entities to be recognized. In addition, some portions of the signal may contain information about multiple parts so that a segmentation into non-overlapping regions, each assigned to a different part, may cause a loss of performance. Therefore, methods are needed that concurrently recognize patterns and segment the input signal into possibly overlapping blocks.

Matching Pursuit

One such method is the matching pursuit algorithm [24] which extracts possibly overlapping signal components from the input signal by searching for the best matching pattern from a specified dictionary. Once the best matching pattern has been identified, it is subtracted from the input signal. Hence, a limitation of matching pursuit is that the interference between components is neglected because components are recognized independently of each other.

Probabilistic Methods

Some probabilistic methods [20, 33, 34, 32, 23] carry out, during signal processing, some kind of statistical sampling computation such as Monte Carlo simulation and Gibbs sampling. These calculations essentially explore a space of hypotheses which may represent, for example, instances of subjects or features. Part of this costly online exploration may be avoided if information about the structure of the space of hypotheses is recovered beforehand by means of an exploration stage performed offline.

SUMMARY OF THE INVENTION

The main objective of this invention is to recognize models and to accurately estimate the associated model parameters in a computationally efficient way. More specifically, another related objective is to extract image features such as edges, corner points and junction points, and to accurately estimate various associated parameters such as location, orientation, and intensity values.

According to one aspect of the invention, a model of the entity of interest is specified that comprises an ensemble of reference patterns representative of the possible instances of the object. In some embodiments, these reference patterns are signals or signal blocks and may represent ideal instances of the model. Or, they may be patterns containing other entities such blobs, lines, etc. or patterns of a statistical nature such as histograms or probability distributions. For example, textured images may be modeled by patterns of this kind. While the reference patterns in the exemplary embodiments disclosed herein are signals, those skilled in the art will recognize how to practice the invention when the appropriate reference patterns are of a different nature.

The ensemble of reference patterns may be provided constructively, that is, by explicitly generating a plurality of signals representative of instances of the entity of interest; or, they may be specified implicitly, e.g., by means of mathematical expressions, constraints, and/or parametric models. In some embodiments, these patterns are (or are approximated by) compositions of simpler patterns, such as linear superpositions and interpolations.

According to another aspect, generators of auxiliary descriptors are provided to aid the recognition of the specified model. These generators may comprise feature detectors, filters (both linear and non-linear), estimators of other models, and any other signal processing means for producing information relevant to the recognition of the specified model. These generators may be utilized because of their efficiency, availability, or low cost; or, they may have been specifically designed for aiding the recognition of the specified model.

Descriptor generators can be implemented by means of a centralized processor that sequentially performs the calculations of one or more generators. Or, they may be implemented as a network of specialized local processors operating in parallel on multiple signal blocks. Typically, some descriptors generated online for a particular input signal are stored in a cache so that they can be utilized multiple times to hypothesize and estimate several model instances.

According to another aspect of the invention, an ensemble of "top-down" reference descriptors is, generated, yielding an additional intermediate representation of the specified model. These reference descriptors may be obtained, for example, by predicting the response of the generators to the ensemble of reference patterns. In some embodiments, these reference descriptors are obtained during an offline exploratory or training stage by simulating the generators on each reference pattern.

In some embodiments, these generators of auxiliary descriptors may be obtained through a fragmentation procedure, whereby the specified model is fragmented into local models and a plurality of generators are constructed that generate estimates for the parameters of these local models. Fragmentation may be carried out by decomposing the domain of the specified model into subdomains and by approximating the obtained subpatterns by means of local approximating patterns, such as polynomial patterns. Fragmentation may be repeated recursively on the local models so that a hierarchy of models is obtained.

In some embodiments, the fragmentation of a model is done in such a way that the interference signals induced on the local patterns are small or minimized. The interference signals may be linearized so that they can be expressed as a sums over the fragments. Moreover, local generators associated to the fragments may be linearized as well so that the shift of the fragments' parameters due to interference can be expressed as a sum over the fragments.

In some embodiments, a fragmented model is parametrized locally, that is, its reference patterns are identified by the parameter obtained by concatenating the parameters of the fragments. One benefit of a local parameterization is that an initial estimate of the specified model is immediately obtained from estimates of the local parameters. Another benefit is that the calculation of the interference signals and the interference shifts are simplified.

According to another aspect, an estimator for the specified model is constructed based on the ensemble of reference descriptors. In typical embodiments, this estimator is constructed during an offline stage and is stored (at least in part) in a memory for use during the online stage. In some embodiments, the reference descriptors are simplified so that they can be expressed as a function of a small number of variables (low valency representation), hence achieving a significant reduction of memory requirements.

According to another aspect, the constructed estimator improves accuracy and detection performance by means of optimization techniques. The optimization criterion may involve comparisons between reference signal patterns and the input signal, between "top-down" reference descriptors and "bottom-up" online descriptors, and between global descriptors and local descriptors. The optimization criterion typically aims at reducing the discrepancies between corresponding descriptors, patterns, and signals. These comparisons may take place during the offline stage, e.g. to calculate interference shifts. They may also take place during online signal processing, for example, to update the current estimate or to select a cell of a lookup table.

In some embodiments, the constructed estimators form a dependency graph and the online descriptors generated for a particular input signal form a corresponding dependency graph. In addition, these dependency graphs may be used to organize the descriptor generation process and to search for model instances; they may be also used to decide which estimator should be executed at a particular point in time and on which clique of online descriptors.

In some embodiments the input signal is an image and the specified models comprise step edge models (SE) and combinations of step edge models such as edge bars (SEx2) and junction models (JN). In addition, other models, such as the polynomial models P1 and P30, are utilized for approximation purposes. These models form hierarchical chains, such as GL-P30-SE-JN or GL-P1-P30-SE-SEx2-JN, where GL, "ground-level", is the input image.

Benefits of the Invention

The disclosed invention has the following advantages over existing methods for pattern recognition and feature detection.

With respect to "flat" optimization methods, that is, methods with a shallow hierarchical structure or with no hierarchical structure at all, the disclosed invention reduces computational requirements by augmenting the basic model with intermediate auxiliary models that simplify and speed up estimation and recognition. The auxiliary reference descriptors at multiple levels provide additional variables to be optimized and "multiscale" guidance to the search for the optimal estimate, thus improving reliability and reducing computational requirements. Moreover, intermediate calculations can be stored in the form of intermediate descriptors and reused multiple times.

With respect to methods that are not based on optimization of a model-based criterion, the disclosed invention attains improved, measurable and predictable accuracy and detection performance.

With respect to methods that do not utilize an ensemble of reference patterns (for example, model-based methods using only local constraints) the disclosed invention makes it possible to compare the recognized instances of the model with a reference. This provides an additional tool for validation and a means to generate qualified estimates, that is, estimates labeled with performance parameters such as uncertainty intervals, probability of correct detection, and confidence measures. In addition, comparison of the current estimate with a reference can be used to create a model-based feedback loop to improve the current estimate.

With respect to methods that do not construct model estimators during an offline stage, the disclosed invention yields better estimators by utilizing more computational resources than those available online. In addition, performance of the estimator can be evaluated systematically during the offline stage and validity regions for each estimator can be determined. Based on this, multiple estimators can be combined to cover a larger region of the parameter space.

With respect to statistical sampling methods that explore spaces of hypotheses online, the disclosed invention reduces online computational requirements by recovering information about the hypotheses space during an offline exploratory stage.

With respect to methods that do not utilize efficient compositional representations such as linear superposition or interpolation, the disclosed invention reduces memory requirements by decoupling the components of a complex models thus avoiding the "curse of dimensionality".

With respect to methods that neglect the interference between model components, such as matching pursuit, the disclosed invention achieves better accuracy and broader applicability, and reduces the requirements on the spatial extent of the entities being recognized.

DETAILED DESCRIPTION OF THE INVENTION

Notation and Terminology

Figure 1:
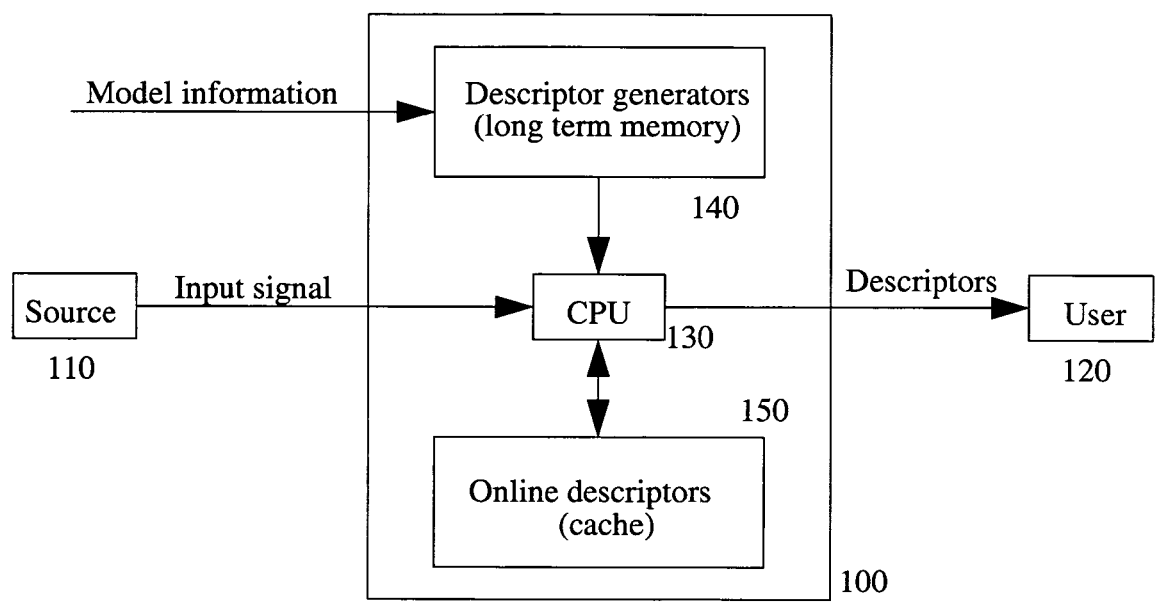
FIG. 1 is a system for pattern recognition and feature extraction based on the current invention.

1. I: the input signal received by the signal processing system. The value of the signal at a "point" (or "site") p is I(p). In some embodiments, I is an image and p=(x,y).
2. U: the set of points, or domain on which the signal is defined, or a subset of it.
3. V: the signal codomain, i.e., the set of values the signal can take on, e.g. V=R.
4. $V^U$: set of signals with support U.
5. Descriptor: a piece of recordable data; it may comprise an estimated model parameter; or, it may be part of the output of a processing or filtering operation performed on the signal.
6. Estimator: means for estimating a model parameter or a pattern. An incremental estimator in one that requires an initialization and produces an updated estimate. An autonomous estimator does not require initialization or provides one internally. An estimator can be either iterative or direct (i.e., non-iterative). An alternating estimator comprises a stage where parameters are updated and another stage that enforces constraints on the parameters.
7. generator of descriptors: means for generating a descriptor; it may comprise an estimator; it may also comprise a filter or any device, procedure, etc. for processing the signal.
8. clique of descriptors: a set of descriptors used jointly, e.g., for model estimation.
9. $\gamma \in \Gamma$: a generic descriptor belonging to a dictionary of descriptors $\Gamma$, or a clique of descriptors.
10. $\theta$, $\phi$: symbols to denote model parameters or descriptors comprising model parameters; $\phi$ is mostly used for local or lower-level parameters, or for initial estimates obtained from the "bottom".
11. $\gamma_k$, $\theta_k$, $\phi_k$, k=1, ..., K: the elements of a set of parameters or descriptors, such as a clique.
12. $\theta_j$, $\theta_{k,j}$, etc: j-th component of a parameter, where j is an integer.
13. $\theta.z$, $\theta_k.z$, etc.: component z of a parameter, where z is a symbol.
14. $\Theta$, $\Phi$, $\Theta_k$, $\Phi_k$: parameter spaces to which $\theta$, $\phi$, $\theta_k$, $\phi_k$ belong.
15. $H(\theta)$, $F(\phi)$, etc.: a pattern associated to the modeling function H or F.

16. (Θ,H), (Φ, F), etc: a pair representing a parametric model.
17. A linear superposition with weights $W_k^{(K)}(\theta)$ is:

$$H(\vartheta) = \sum_{k=1}^{K} W_k^{(K)}(\vartheta) F_k(\vartheta_k). \quad (1)$$

18. A weight-free superposition is obtained when $W_k^{(K)}(\theta)=1$:

$$H(\vartheta) = \sum_{k=1}^{K} F_k(\vartheta_k). \quad (2)$$

Figure 3A:
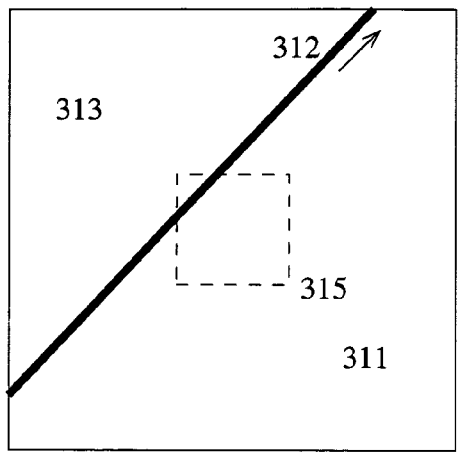
FIG. 3A-3E depict models used in image processing embodiments of the invention.

19. I(U), H(U; θ), F(U; φ), etc: vector of signal values inside the domain U.
20. $H^{P0}(p; v_0)=v_0$: constant pattern (0-th order polynomial);
21. $H^{P1}(p;g,v_0)=v_0+g^T p$: pattern with constant gradient $g=(g_x, g_y)$ (1-st order polynomial);
22. (ψ, ρ): scalar parameters specifying a straight line (orientation and distance from a reference point).
23. $H^{P30}(p;\theta)=H^{P30}(p; \psi, \rho, \sigma_b, a, v_0)$: a cubic edge pattern (third order polynomial varying in the direction perpendicular to an edge line), given by:

$$H^{P30}(p;\theta)=v_0+gX_p(1-X_p^2/(3\sigma_b^2)), \quad (3)$$

where $X_p=\xi(p; \psi, \rho)$ is the coordinate perpendicular to the step-edge line (ψ,ρ); $\sigma_b>0$ is a blur (or scale) parameter; g∈R and $v_0$∈R are the gradient magnitude and pattern value on the edge-line.
24. $H^{P30}(p; \psi, \rho, \sigma_b, v_1, v_2)$: an equivalent parameterization of P30 patterns, where $v_1$ and $v_2$ are the values on the right and left extremum lines of the pattern.
25. $H^{SE}(p; \psi, \rho, v_1, v_2)$: step-edge pattern (see FIG. 3A) with values $v_1$ and $v_2$ on the right (311) and left (313) sides of the step-edge line 312, specified by (ψ, ρ).
26. $H^{SE}(p; \psi, \rho, a, v_0)$ equivalent parameterization of SE patterns where $$v_0 = \frac{v_1+v_2}{2}, a=v_2-v_1.$$

Figure 3B:
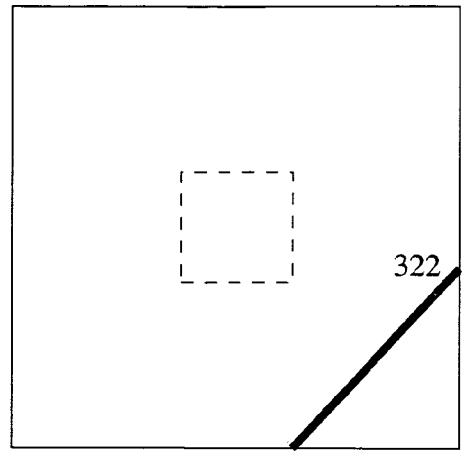
Figure 3C:
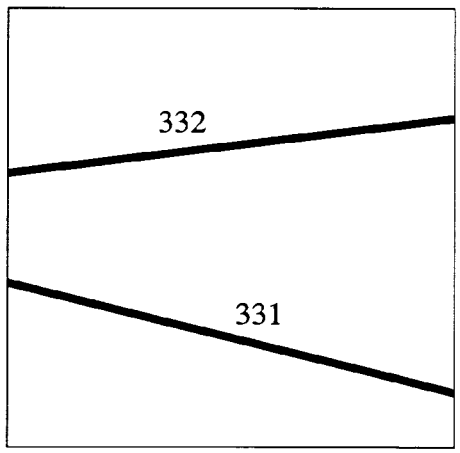
Figure 3D:
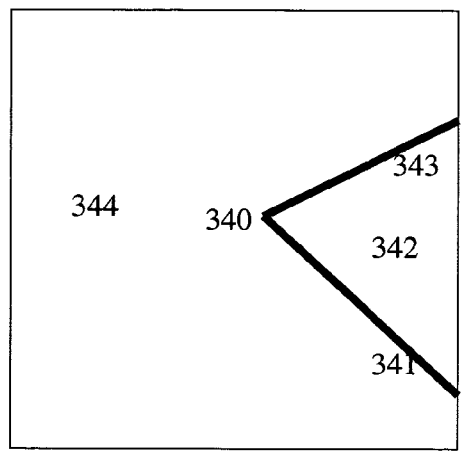
Figure 3E:
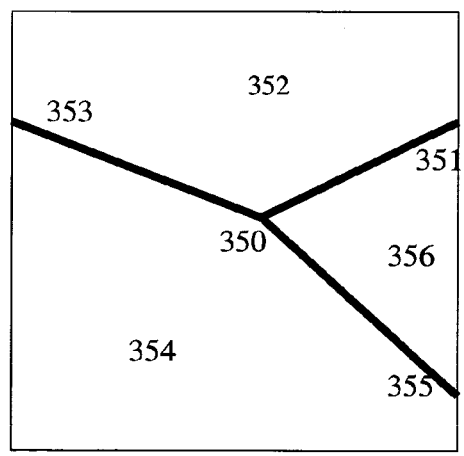

27. $H^{SE}(p; q, \psi, v_1, v_2)$: an alternative (redundant) parameterization of SE patterns, in which q is an arbitrary point on the step-edge line 312.
28. $H^{Wdg}(p; q, \psi_1, \psi_2)$: a binary wedge pattern as shown in FIG. 3D, with value 1 in the sector 342, which has a vertex 340, denoted q, and is delimited by two the semi-lines 341 and 343, having orientations $\psi_1$ and $\psi_2$. The pattern is 0 in 344.
29. $\hat{H}^{Wdg}(q,\psi,\alpha,\sigma_b)$ is another parameterization of the wedge patterns, where $\hat{H}_{Wdg}(q,\psi,\alpha,\sigma_b)$ is equal to either $H_{Wdg}(q, \psi,\psi=\alpha, \sigma_b)$, if α≧0, or $H_{Wdg}(q,\psi+\alpha,\psi, \sigma_b)$, if α<0.
30. $H^{Jn}(q, \underline{\psi},\underline{v})$: a junction pattern as shown in FIG. 3E, having: a vertex point 350, denoted q; N "branches" with orientations $\underline{\psi}=(\psi_1, \ldots, \psi_N)$ (351, 353, and 355); and N sectors 352, 354, 356, having values $\underline{v}=(v_1, \ldots, v_N)$; the k-th sector is delimited by the branches with orientations $\psi_k$ and $\psi_{k+1}$. The sequence $(\psi_1, \ldots \psi_N)$ is assumed to be counter-clock-wise ordered (so that sectors do not overlap), and $\psi_k=\psi_{k(mod\ N)}$, $v_k=v_{k(mod\ N)}$, $\forall k \in \mathbb{Z}$.

31. $\hat{H}^{SE}(p; \psi, \rho, v_1, v_2, \sigma_b)$, $\hat{H}^{Wdg}(p; q, \psi_1, \psi_2, \sigma_b)$, $\hat{H}^{Jn}(q, \underline{\psi}, \underline{v}, \sigma_b)$, etc.: the patterns obtained by smoothing the corresponding patterns with a 2D Gaussian filter.
32. An affine codomain transformation maps a pattern H(θ) to aH(θ)+$v_0$. Correspondingly, we have a map θ↦aθ+$v_0$. For example, for SE patterns with θ=ψ, ρ, $\sigma_b$, a, $v_0$):

$$a\theta+v_0 \triangleq \underline{A}(\psi, \rho, \sigma_b, a'a, a'v_0+v_0'). \quad (4)$$

33. f,h, etc.: the signal-level descriptor map (or estimator map) associated to a localized descriptor generator (or estimator): on input I, the generated descriptor is f(I); if U is the support of the localized generator, then f(I)=f(I(U)). f may also denote a clique of localized descriptor generators f=($f_1$, ..., $f_K$) with supports $U_1$, ..., $U_K$; then f(I) is a clique of descriptors or model parameters.
34. (U, f) or (U, f, Γ) denotes a localized descriptor generator with support U and dictionary Γ.
35. ∇f is the derivative matrix of the descriptor map: $(\nabla f)_{i,j}=\partial f_j/\partial v_i$, where $v_i=I(p_i)$.
36. The sensitivity matrix for a localized generator (U, f) is:

$$\Sigma(\theta)=(\nabla f)^T(H(U;\theta))\cdot \nabla f(H(U;\theta)) \quad (5)$$

37. The optimal sensitivity matrix, representing an upper bound on the accuracy performance (for unbiased estimators) is:

$$\Sigma^*(\theta)=(\nabla H^T(U; \theta)\cdot \nabla H(U; \theta))^{-1}. \quad (6)$$

38. r(θ): reference descriptor (or reference clique). Typically, it is given by a prediction map f∘H: r(θ)=f(H(θ)).
39. $H(U; \theta)\approx_k F_k(U_k; \phi_k)$: fragmentation of a global pattern H(U; θ) into approximating local patterns $F_k(U_k; \phi_k)$ with local domains $U_k \subset U$.
40. A local parameterization of a fragmented pattern is one where the global pattern is $H(U; \theta)=H(U; \theta_1, \ldots, \theta_K)$ and the local patterns are $F_k(U_k; \theta_k)$. The concatenated parameter θ is typically subject to a constraint.
41. $\Delta_k(\theta)=H(U_k; \theta)-F_k(U_k; \theta_k)$: the interference signal on the k-th fragment.
42. $s_k(\theta)$: the interference shift of the k-th local parameter: $s_k(\theta)=r_k(\theta)-f_k(F_k(\theta_k))$.

System for Model Recognition

FIG. 1 illustrates a system 100 for recognizing models in a signal according to the teachings of the disclosed invention. During an online stage, an input signal is produced by a signal source 110 and is delivered to the recognition system 100, which then recognizes model instances and represents them by descriptors. These descriptors may be delivered to a user 120 or may be stored in a short term memory (cache) 150 and utilized by the recognition system itself to estimate more model instances.

The system 100 typically comprises at least one processing unit, at least one memory unit (e.g., RAM, hard disk, etc.), and suitable channels to receive the signal from the source and to deliver the descriptors to the user. The particular embodiment shown in FIG. 1 contains one central processing unit 130, one long term memory unit 140 and a short term memory unit (cache) 150. The long term memory unit and the cache are shown as being distinct from each other for functional reasons; however, they may be implemented by the same physical unit or units.

In the embodiment shown in FIG. 1, the CPU 130 implements generators of descriptors, including model estimators, that are used for model recognition. These generators rely on information stored in the long term memory. This information typically includes some of the following items: operators such as associative maps, lookup tables, pseudo-inverse matrices, gain matrices, and sensitivity matrices; reference signals, reference patterns, and reference descriptors; a graph representing dependencies between the generators.

The content of the long term memory is typically constructed during an offline stage according to the teachings of the disclosed invention and based on model information received from the source, the user, and any other available source of knowledge.

During the online stage, the recognition system generates online descriptors that may be stored in the cache 150 and utilized one or more times to aid the estimation and recognition of the models of interest. These online descriptors are typically organized according to a dependency graph that mirrors the dependency graph stored in the long term memory. The user may deliver requests and information to the recognition system as to which models should be sought in the input signal and the manner of performing this search.

In some other embodiments (not represented by FIG. 1) the descriptor generators may be implemented as a network of processors.

Overview of the Pattern Recognition Method

Figure 2:
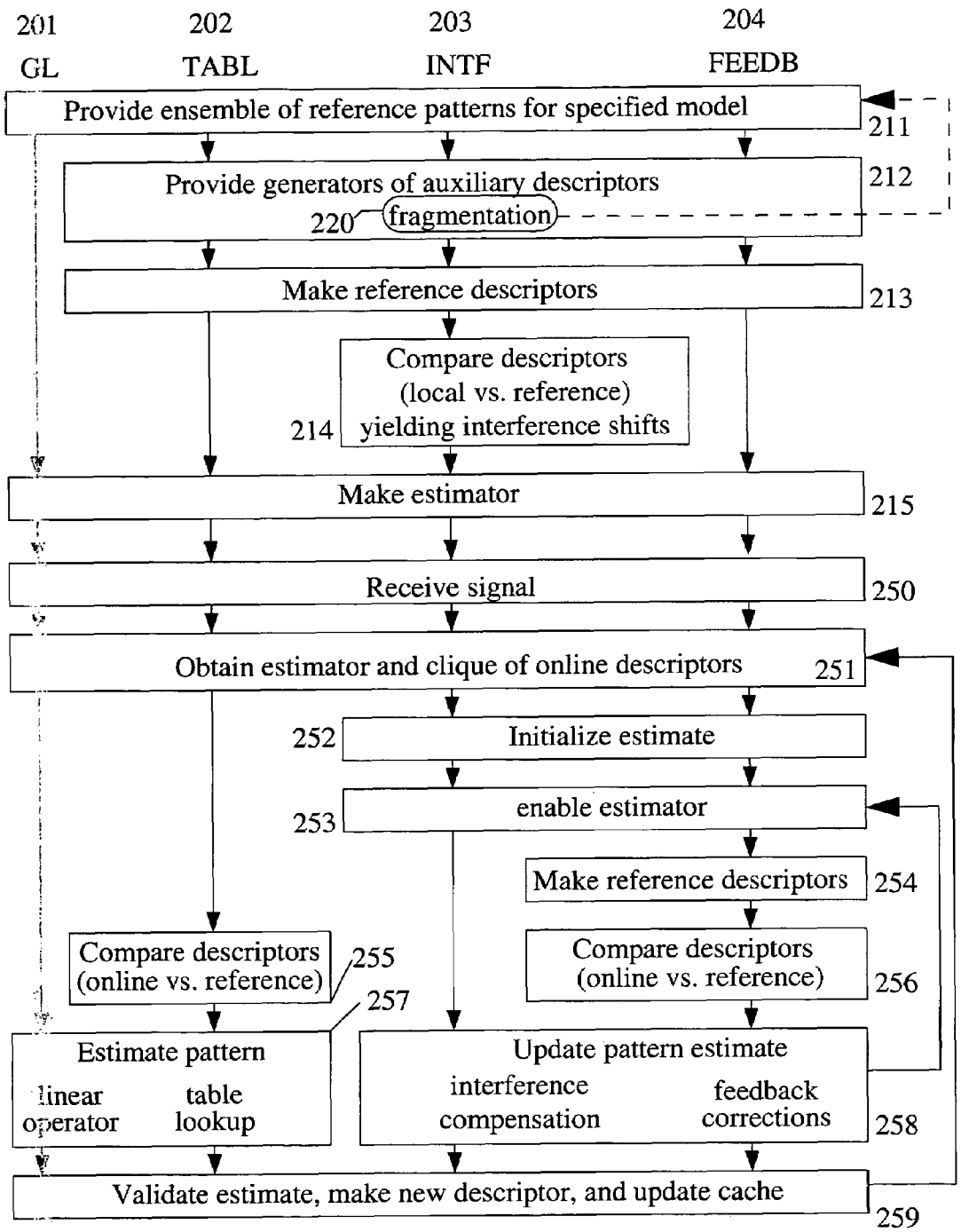
FIG. 2 is a flowchart that depicts a method to practice the invention.

FIG. 2 depicts a pattern recognition method which exemplifies typical embodiments of the invention. The recognition method comprises an estimator construction method, including steps 211-215, which constructs estimators for the specified models, and a signal processing method, including steps 251-259, which executes the constructed estimators to recognize instances of the specified models.

The estimator construction method may call itself, as indicated by the arrow line from step 212 to step 211, to construct estimators for local models obtained through a fragmentation procedure, thus yielding hierarchical chains of models and estimators. Correspondingly, sequences of steps of the signal processing method may be performed multiple times, each time by executing a different estimator from a hierarchical chain of estimators, thus recognizing hierarchical chains of models, such as the P30-SE-JN chain of edge models.

The estimator construction method, which is preferably carried out offline, and the online signal processing method may be interleaved in any order provided that the estimators for the models being sought in a particular input signal have been constructed beforehand. In some cases, e.g. if the memory resources are such that certain estimators can not be stored in the long term memory, the estimator construction method may be performed while processing the input signal.

The manner and the order in which certain basic steps are performed may vary depending on the type of model specified and on other constraints, such as limits on memory resources. This flexibility of the method is illustrated by the four paths 201-204 for constructing and executing estimators depicted in FIG. 2. Not all paths are necessarily used by an embodiment of the invention and none of them is required.

Step 211 provides an ensemble of reference patterns and is performed by all paths. The "ground-level processing" path 201 proceeds from step 211 directly to constructing an estimator, step 215. The other three paths execute step 212 to provide generators of auxiliary descriptors. These generators may be off-the-shelf signal processing means, or they may be the result of a fragmentation step 220. An ensemble of reference descriptors is then generated, at step 213, based on these generators of auxiliary descriptors. The "interference" path 203, before constructing an estimator, performs, at step 214, comparisons between reference descriptors and local descriptors to calculate parameter shifts due to interference (see Eqs. (13) and (18)).

At step 250, an input signal is received or otherwise provided. The steps 251-259 of the signal processing method are typically performed multiple times by executing different estimators and by processing different blocks of the input signal.

Step 251 obtains a clique of online descriptors, which have been generated, either directly or indirectly through other descriptors, from the current input signal. Step 251 may select these online descriptors from a cache, or it may receive them from an external source. Alternatively, it may generate them by executing an available or constructed descriptor generator. This clique of online descriptors may consist of a signal block, that is, a collection of signal samples. These "ground-level" cliques are utilized, for example, by the ground-level processing path 201 which constructs and executes estimators that operate directly on the input signal. In addition, step 251 selects a model to be recognized and obtains an estimator for said model. The order and manner in which the clique of online descriptors, the model to be recognized and the estimator are determined may vary as described in section "Searching for model instances" of this disclosure.

The interference path 203 and the "close-loop estimation" path 204 perform step 252, which generates an initial estimate of a model instance; then, step 253 enables the estimator obtained at step 251 so that it becomes fully executable. Typically, this includes selecting operators, such as matrices, that may be dependent on the current estimate.

The ground-level processing path 201, instead, proceeds directly from step 251 to step 257, estimation of a pattern. The "table lookup" path 202 compares the clique of online descriptors against an array of reference descriptors (step 255) to identify the appropriate cell of a lookup table and possibly, to determine a coefficient used for interpolation.

After step 253, the interference path 203 proceeds to step 258 to update the current estimate by means of interference shift compensation. The close-loop estimation path 204 generates a clique of reference descriptors (step 254) based on the current estimate and then, at step 256, compares it with the online clique of descriptors, as shown in Eqs. (24), (25), or (19) (the latter representing an hybrid between the table lookup path 202 and the closed-loop estimation path 204). Then a feedback correction is generated at step 258, based on the comparison between reference descriptors and online descriptors of step 256.

Finally, step 259 validates the estimate, generates a new descriptor (if the validation is successful) and updates the cache by integrating the new descriptor into it. Validation may include a comparison between the reference pattern specified by the estimate and the input signal.

Iterative estimators (paths 203 and 204) may proceed from step 258 back to step 253 to update the estimator's operators (e.g., the gain matrices or the interference shifts) and initiate another iteration; or, provided a suitable termination condition is satisfied, they may proceed to step 259.

Once the new estimate has been processed by step 259, the online signal processing method may either return to step 251 or it may conclude that no more model instances should be sought in the input signal and terminate.

The various paths shown in FIG. 2 share some key steps, such as the generation of reference descriptors and comparisons involving descriptors, patterns and signals; these steps are performed by the different paths at different stages of the overall method so as to best adapt to the constraints of the situation at hand.

Ensemble of Patterns Representative of Model Instances

The objective of step 211 is to specify an initial model for the entity of interest. This model comprises an ensemble of reference patterns that represents the possible instances of the entity. One approach to specify a model is to utilize a training sample of signals produced by the source. Another one is to rely on known invariance properties, based on which an ensemble of patterns is obtained by applying a set of transformations to a prototype signal or pattern. Another approach is to provide primitive models and compositional procedures, e.g. linear superposition and interpolation. Models are also obtained by fragmenting a model into local models.

In some preferred embodiments, the reference patterns are specified by means of a parametric model and are denoted H(θ), where θ is a model parameter and H is a modeling function. In typical embodiments, the pattern H(θ) is a signal that represents an ideal noise-free instance of the model.

Models used in image processing Image processing embodiments of this invention utilize two classes of parametric models. One class, motivated by computational reasons, is based on polynomial functions and provides a basis of approximators for more complex patterns. Examples of these models are the constant gradient patterns $H^{P1}(g, v_0)$, Def. 21, and the cubic step-edge patterns $H^{P30}(\psi, \rho, \sigma_b, a, v_0)$, Def. 3.

The other class, which is motivated by general properties of typical picture sources, is obtained by convolving elementary patterns based on geometric entities such as straight lines and corners, with a blurring operator that describes the optics of typical imaging devices. Example of these models are the blurred step-edge patterns $H^{SE}(\psi, \rho, v_1, v_2, \rho_b)$, Def. 25, depicted in FIGS. 3A and 3B; the bar-edge, depicted in FIG. 3C, given by the combination of two step-edges 331 and 332; the blurred wedge patterns $H^{Wdg}(q, \psi_1, \psi_2, \rho_b)$, Def. 28, depicted by FIG. 3D; and the blurred junction patterns $H^{Jn}(q, \underline{\psi}, \underline{v}, \sigma_b)$, Def. 30, depicted in FIG. 3E. See the section on notation for more details.

Notice that two types of step edge patterns are used. In the first one, denoted SEc ("centered" step edge) and shown in FIG. 3A, the edge line passes through a central region 315 of the domain 316. In the second more general type, denoted SEnc ("non centered" step edge), shown in FIG. 3B, the edge line intersects the domain but is otherwise in an arbitrary position.

Ensemble of reference patterns are obtained by varying the multi-dimensional model parameter θ of these models within suitable model parameter spaces Θ.

Compositional methods, such as linear superposition and interpolation, can be used to obtain complex models from simpler ones. As an example, a junction pattern can be obtained by linearly superposing a finite set of wedge patterns having the same vertex.

$$H^{Jn}(q, \underline{\psi}, \underline{v}, \sigma_b) = \sum_{k=1}^{N} v_i H^{Wdg}(q, \psi_k, \psi_{k+1}, \sigma_b). \quad (7)$$

The Descriptor Dependency Graph

The dependency graph is a useful tool for describing the operation of the present invention. In addition, embodiments of the invention may implement a dependency graph to represent complex model estimators and to organize the search for model instances in the current input signal.

Figure 4:
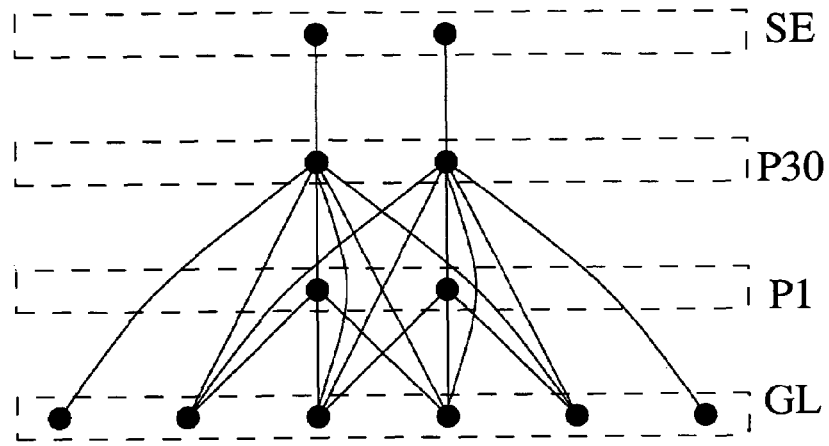
FIG. 4 illustrates an example of a dependency graph.

In general, descriptor generators, which include also model estimators, operate on signal blocks or on descriptors generated from signal blocks. Hence, a generated descriptor can be denoted f(I(U)) where U is the support of the descriptor and f is a function, called descriptor map, representing the input-output relationship of the generator when applied to a signal block with domain U (see Def. 33). Every localized descriptor generator, identified by a support U and a descriptor map f, is represented by a node of the dependency graph. A node that utilizes descriptors generated by another node is linked to it by an incoming link. A set of generators whose generated descriptors can be used jointly by a node are said to be a clique of generators. The individual samples of the input signal, I(p), are represented by nodes that form the ground-level of the dependency graph. An example of a dependency graph is shown in FIG. 4, in which the ground level contains 6 signal samples arranged along a line. The direction of the links, which is not shown for clarity, is bottom-up. The graph contains three additional layers and illustrates schematically the estimation methods for P30 and SE models described in forthcoming sections. Note that the P30 nodes are linked-both to the ground-level and to the P1 layer.

Validity region Typically, a localized estimator provides good estimates for a parameter θ only if the value of θ belongs to a support-dependent subset of the parameter space Θ, called the validity region of the localized estimator. For example, estimation of a step-edge model requires that the step-edge line passes sufficiently near to the center of the support U and that the size of U be proportional to the scale of the edge.

Therefore, in order to cover any possible instance of the model, a suitable collection of supports must be utilized so that each parameter value is covered by at least one localized estimator. Thus, one requirement on the dependency graph is that the combined validity region of the layer of nodes estimating a particular model cover the entire parameter space of the model. Typically, overlapping supports with sufficiently high density are required to satisfy this requirement.

Ground-Level Estimators

A descriptor generator that operates on the signal without the aid of other descriptors is a ground-level generator. For example, polynomial models such as $H^{P1}(g, v_0)$ and $H^{P30}(\psi, \rho, \sigma_b, a, v_0)$ can be estimated in a least-square sense by multiplying a signal block I(U) by a suitable pseudo-inverse matrix, as explained in more details in references [22, 26] and in U.S. Provisional Patent Applications No. 60/584,049, and No. 60/675,887, which are hereby incorporated by reference. The resulting estimators are direct (that is, non-iterative) and autonomous (see Def. 6). To construct these estimators, the pseudo-inverse matrices are generated and typically stored in the long term memory during an offline stage.

Estimation of P30 models A more specific procedure to estimate instances of the $H^{P30}$ model is as follows: 1) estimate orientation by fitting an $H^{P1}$ pattern to a first signal block; 2) multiply a second, usually larger signal block, by an orientation-dependent pseudo-inverse matrix, to obtain the linear coefficients of a fitted $H^{P30}$ pattern; 3) Estimate the parameters $\rho, \sigma_b, a, v_0$ algebraically frown these linear coefficients, according to methods well known in the art and also described in U.S. Provisional Patent Applications No. 60/584,049, and No. 60/675,887.

Fragmentation

Estimators for more complex models are constructed by first introducing, at step 212, a set of generators of auxiliary descriptors. In some preferred embodiments, a fragmentation procedure 220 is used to obtain these generators. According to this procedure, a reference pattern $H(U; \theta)$ of the specified model is represented by a clique of local patterns $F_k(U_k; \phi_k)$, $\phi_k \in \Phi_k$; generators of auxiliary descriptors $(U_k, f_k)$ are then provided that generate estimates of these local patterns.

In some embodiments, the local patterns $F_k(U_k; \phi_k)$ are obtained by fragmenting the reference pattern $H(U; \theta)$ into one or more subpatterns $H(U_k; \theta)$ and by providing local patterns $F_k(U_k; \phi_k)$ that are easier to estimate and that approximate the subpatterns $H(U_k; \theta)$. An estimator for each local model $(\Phi_k, F_k)$ can be obtained, for example, through a new call to the estimator construction method (arrow from 212/220 to 211).

In some preferred embodiments, the domains U and $U_k$ are selected from a set of available domains. To simplify the search for model instances and, in particular, step 251, the set of available domains is typically restricted to a set containing just enough domains to ensure that the combined validity region of the localized estimators contains the entire parameter space of the model. In image processing, the choice may be limited to square or rectangular domains of various sizes and with a sufficiently high density. In some embodiments, all the domains with a standard shape and a given small size (e.g., 4×4 windows) are included.

One fragmentation strategy adopted in some embodiments is to select a very basic domain fragmentation. For example, U may be simply split into two equal parts, as shown in FIG. 6B, yielding a binary dependency graph and a rather simple implementation of step 251. Another strategy is to allow more degrees of freedom in the choice of the subdomains so that the resulting fragmentation is more in tune with the structure of the pattern, as illustrated in FIG. 6C. This simplifies the construction of the estimator, step 251, and the estimation steps 257 and 258, but requires a more complex implementation of the search step 251. Examples of using these two strategies are described in the subsection "Fragmentation of a junction pattern" of this disclosure. To determine an appropriate tradeoff point that optimizes the benefits and costs of the two strategies, a case-by-case analysis may be necessary.

To obtain the approximating patterns $F_k(U_k; \phi_k)$, conventional methods may be used, such as calculating a Taylor approximation of the function $p \mapsto H(p; \theta)$. An approximating pattern may be chosen based on an already given subdomain $U_k$ so that the approximation is valid inside $U_k$; or, the subdomain $U_k$ may be chosen based on a given approximating pattern that has been selected first.

Figure 5A:
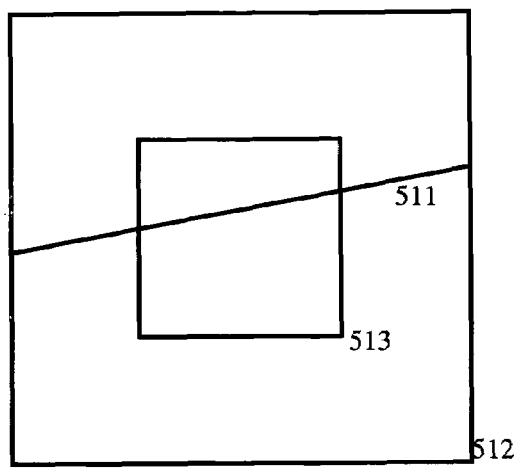
FIG. 5A-5B illustrate two possible fragmentations of a step edge model.
Figure 5B:
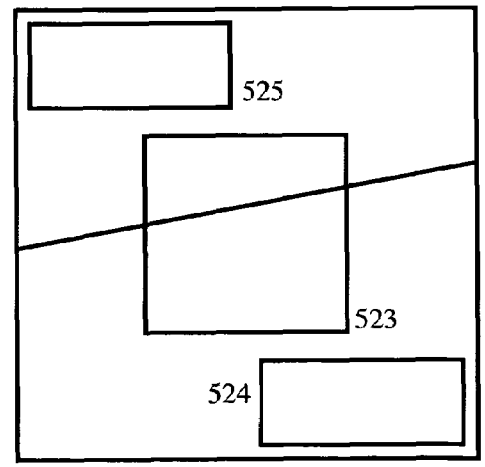

Fragmentation of a blurred step-edge pattern A fragmentation may contain just one fragment. As an example, shown in FIG. 5A, a blurred step-edge pattern $H^{SE}(U; \theta^{SE})$, having a domain 512, denoted U, is approximated by a third order Taylor expansion in a subdomain 513, denoted $U_1$, whose points are all sufficiently close to the edge-line 511, yielding a cubic edge pattern $H^{P30}(U_1; \theta^{P30})$. This particular approximation is well known in the art [29]. The pattern $H^{P30}(U_1; \theta^{P30})$ can be further fragmented into a first order Taylor approximation, yielding a hierarchical chain of models P1-P30-SE. Another possible fragmentation of $H^{SE}(U; \theta^{SE})$, shown in FIG. 5B, is given by one $H^{P30}$ fragment 523 and two $H^{P1}$ (or $H^{P0}$) fragments 524 and 525.

In order for a particular fragmentation to be applicable, the parameter $\theta$ must belong to an appropriate validity region. For example, the fragmentation of FIG. 5A, where the subdomain 513 is a square region having the same center as the domain 512, requires that the distance from the step edge line to the center of 512 and 513 be less than a threshold. Hence the fragmentation is applicable only to the centered step edge models, SEc, illustrated in FIG. 3A.

Interference-Based Fragmentation

A strategy utilized by this invention to fragment a pattern into multiple fragments is to reduce or minimize the interference between the fragments so that linearization methods can be used. The interference signal on the k-th fragment, denoted $\Delta_k(\theta)$, is the difference between the reference pattern $H(\theta)$ and the local pattern $F_k(\phi_k)$, restricted to the k-th subdomain.

A local parameterization (Def. 40) is convenient to express the interference signals. To obtain a local parameterization, let $\theta_k \equiv \phi_k$ be the local parameter such that $F_k(\phi_k) \equiv F_k(\theta_k)$ is the local pattern corresponding to the reference pattern $H(\theta)$. For example, $F_k(\phi_k)$ may be the best possible approximation to the subpattern $H(U_k; \theta)$. Then, the local parameterization is obtained by choosing $\theta \equiv (\theta_1, \ldots, \theta_K) \equiv (\phi_1, \ldots, \phi_K)$ to be the parameter for the "global" model, so that the reference patterns can be written as: $H(\theta) = H(\theta_1, \ldots, \theta_K)$, and the corresponding local pattern as $F_k(\theta_k)$. Clearly, this construction requires that the concatenated parameter $(\phi_1, \ldots, \phi_K)$ uniquely identifies a reference pattern; in turn, this requires that the combined dimensionality of the local parameters be equal or larger than the dimensionality of the reference patterns. In addition, since in general not all combinations of the local parameters are consistent with a reference pattern, the new model parameter $(\theta_1, \ldots, \theta_K)$ is subject to constraints. These constraints guarantee that the dimensionality of the reference patterns does not change.

With a local parameterization, the interference signal is:

$$\Delta_k(\theta) = H(U_k; \theta) - F_k(U_k; \theta_k), \theta = (\theta_1, \ldots \theta_K). \tag{8}$$

This formula may be hard to use directly because the dimensionality of the variable $\theta$, which appears as an argument on the right hand side, is in general too large. One approach to deal with this problem is to linearize the reference pattern $H(\theta)$ so as to decouple the contributions of the fragments to the interference. Another approach is the 2-occupancy approximation described in a following section of this disclosure. For example, if $H(\theta)$ is a weight-free superposition (Def. 18), and if $H(\theta)$ is fragmented into its additive components, then the interference signal is given by:

$$\Delta_k(\theta) = \sum_{k' \neq k} F_{k'}(U_k; \theta_{k'}). \tag{9}$$

Notice that the dimensionality of this expression is equal to the highest dimensionality of the fragments.

Notice also that the interference in a weight-free superposition pattern is small whenever $F_{k'}(U_k; \theta_{k'})$ is small for all $k' \neq k$, that is, whenever the signal "leaking" from one fragment k' into the subdomain of another fragment k is small. Here, "small" is not intended to mean "negligible", for linearization methods can mitigate substantial interference signals as long as their effects can be linearly approximated.

Hence, if each additive components of the superposition is concentrated in a particular domain, called the support of the additive component, then the interference is small if each fragmentation's subdomain has small overlap with all of these supports except for one. This strategy is exemplified and further described by means of the junction model example.

Fragmentation of a Junction Pattern

By noting that a junction pattern $H^{Jn}(U; q, \underline{\psi}, \underline{v}, \sigma_b)$ converges to the step-edge pattern $H^{SE}(q, \psi^k, v_{k-1}, v_k, \sigma_b)$ near the k-th branch and far away from the vertex point q, one obtains fragmentations of the form (see FIG. 6C):

$$H^{Jn}(U; q, \underline{\psi}, \underline{v}, \sigma_b) \underset{k=1}{\overset{N}{\approx}} H^{SE}(U_k; q, \psi_k, v_{k-1}, v_k, \sigma_b). \tag{10}$$

By pushing the subdomains $U_k$ (637,638,639 in FIG. 6C) away from the vertex q (630 in FIG. 6C), the interference signals of the above fragmentation can be made arbitrarily small. However, it is often desirable to keep the subdomains close to each other. For example, the extent of the junction pattern in the input image may be limited so that the subdomains can not be moved far away from the vertex. Moreover, the junction pattern may be "drifting" at large distances, e.g., the values $v_k$ and $\psi_k$ may change when moving along the branch, so that estimation of the junction parameter requires that the subdomains be as near as possible to the vertex. In addition, the choice of subdomains is typically restricted so as to simplify the search performed at step 251. Thus, in general, interference signals can be made small but not totally negligible.

Conversely, the objective of controlling interference places constraints on the choice of subdomains and the structure of the dependency graph. These constraints typically require that the spatial density of the nodes be sufficiently high or, equivalently, that the corresponding domains have sufficient mutual overlap. This ensures that at least one combination of nodes exist for which the interference is sufficiently small.

Figure 6A:
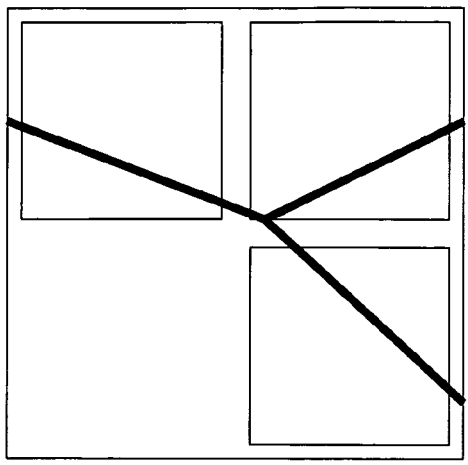
FIG. 6A-6E and FIG. 7A-7C depict several fragmentations of a junction model.
Figure 6B:
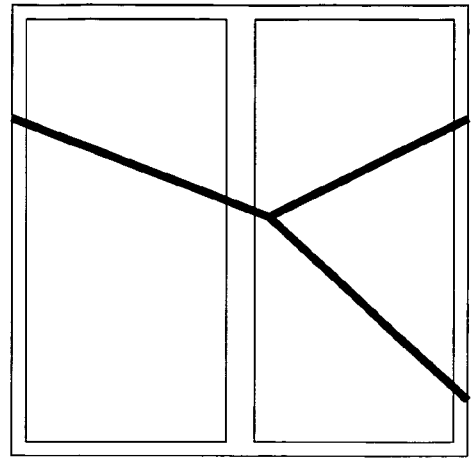
Figure 6C:
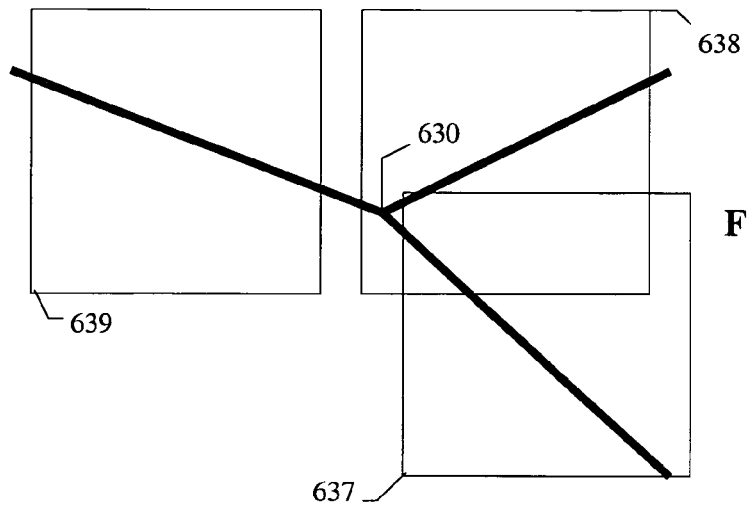

These considerations regarding the design of a fragmentation are illustrated by the examples in FIG. 6A-6E. FIG. 6A depicts a fragmentation of a JN pattern into three SE patterns obtained by partitioning its square domain U into four non-overlapping squares of equal sizes. In order for the interference signals to be small, the junction's vertex should be near the periphery of all the subdomains, as shown in FIG. 6A. Hence, the spatial density of these domains in the dependency graph must be sufficiently high so that this requirement is satisfied for at least one JN node of the dependency graph.

FIG. 6B depicts a fragmentation of the same junction pattern obtained by splitting the domain vertically. Notice that the local pattern on the right is a 2xSE pattern. An additional fragmentation, obtained by splitting the subdomains horizontally, is needed to produce a fragmentation into 3 SE patterns like the one in FIG. 6A.

FIG. 6C depicts a fragmentation with "loose" subdomains. Here, more flexibility is permitted in choosing the subdomains, resulting, in general, in smaller interference signals. However, this may unduly complicate step 251; hence, very loose fragmentations are typically not recommended, unless the interference resulting from tighter fragmentations is too large.

Figure 6D:
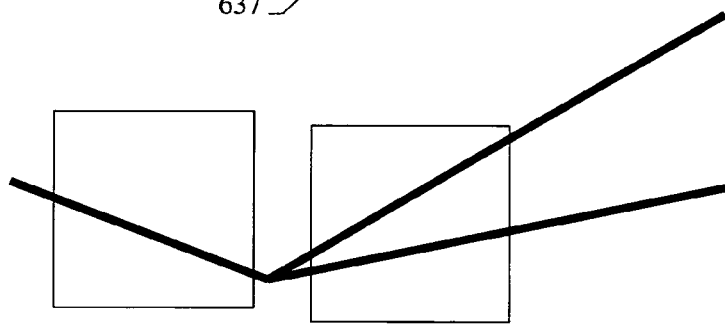
Figure 6E:
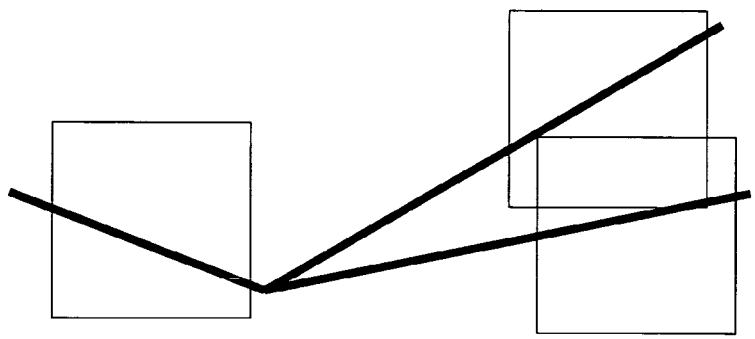

FIGS. 6D and 6E illustrate the difficulty arising when the junction contains branches with very similar orientations: a fragmentation into 3 SE patterns can be obtained only if the subdomains are very far from the vertex (FIG. 6E); if the subdomains are constrained to be close to each other, then one of the fragment must be a 2xSE pattern, as shown in FIG. 6D.

In addition, these examples show that when constraints are placed on the choice of the subdomain, the centered step edge models SEc alone are not sufficient to fragment arbitrary junction patterns: the non centered step edge models SEnc must be used as well. Moreover, submodels of type SEx2 are also required (unless the junction patterns are restricted to have wide sectors).

Figure 7A:
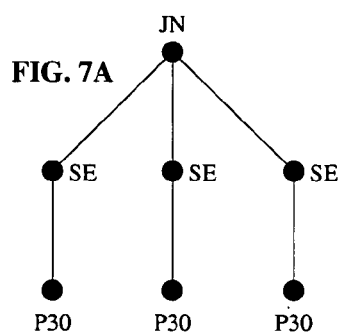
Figure 7B:
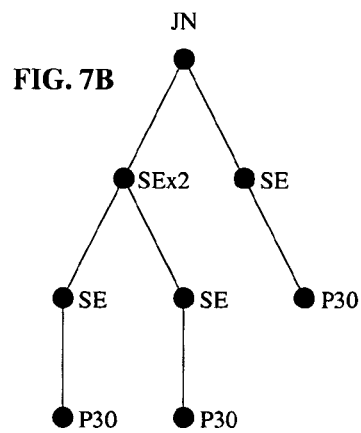
Figure 7C:
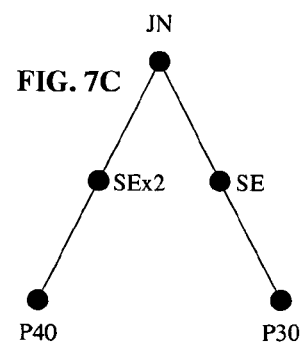

FIG. 7A-7C illustrate these different junction fragmentations by means of dependency "diagrams", representing pieces of the dependency graph. FIG. 7A corresponds to FIGS. 6A, 6C and 6E. FIG. 7B corresponds to FIG. 6B, where it is assumed that the vertical domain split is followed by an horizontal domain split, as described earlier. Finally, FIG. 7C corresponds to FIG. 6D (or to FIG. 6B if the second horizontal domain split is not carried out). Notice that one of the leaf of the graph in FIG. 7C is a fourth order polynomial pattern (P40), which may be used as auxiliary estimator to estimate 2xSE patterns. Any other bar-edge detector may be used in lieu or the P40 estimator.

Linear representation of the interference signals within a junction To illustrate the interference based approach, I now describe an efficient linear representation for the interference signals induced by a junction on its constituent SE patterns. First, let us obtain a local parameterization of a junction pattern (see Def. 40). Let $\theta_k$ be the 6-dimensional step-edge model parameter with components q, $\psi$, $v_1$, $v_2$, $\sigma_b$ (see Def. 27), and let the model parameter of the junction be the concatenation of the parameters of its constituent step edges: $\theta = (\theta_1, \ldots, \theta_N)$ with the constraints:

$$\theta_{k'}.q = \theta_k.q; \ \theta_{k'}.\sigma_b = \theta_k.\sigma_b; \ \theta_k.v_2 = \theta_{k+1}.v_1.$$

Figure 8A:
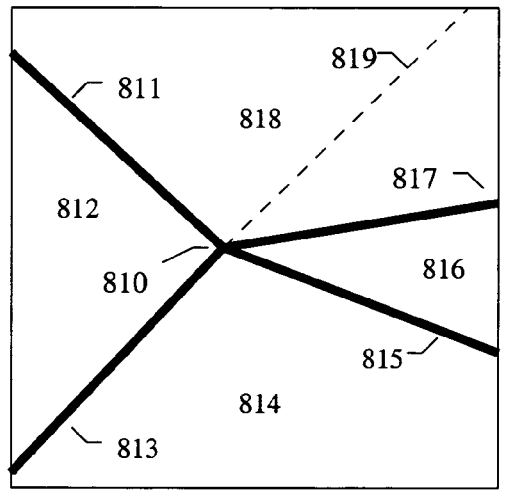
FIG. 8A-8B illustrates the calculation of the interference signals within a junction pattern.

The interference signals associated with this fragmentation can be represented as a linear superposition of wedge patterns. This representation is better understood by referring to the example shown in FIGS. 8A and 8B. FIG. 8A depicts a junction with four branches, 811,813,815,817, four sectors 812,814,816,818, and vertex 810. Let us single out the k-th branch 813; then the interference on the k-th branch can be written as:

$$H^{Jn}(q, \underline{\psi}, \underline{v}, \sigma_b) - H^{SE}(q, \psi_k, v_{k-1}, v_k, \sigma_b) = \tag{11}$$
$$\sum_{k'=1}^{N-1} \tilde{v}_{k'} H^{Wdg}(q, \tilde{\psi}_{k'}, \tilde{\psi}_{k'+1}, \sigma_b).$$

Figure 8B:
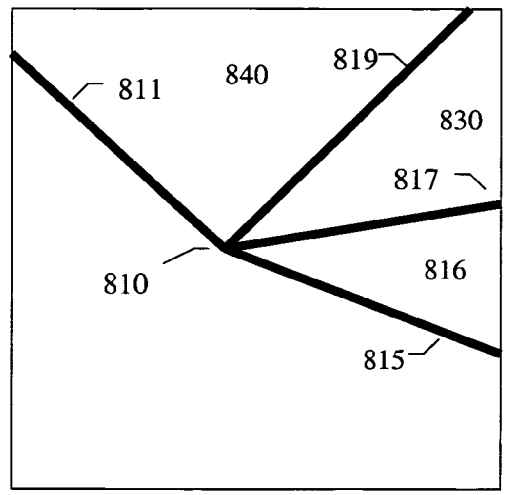

The wedges on the right hand side of this formula correspond to the sectors 816,830 and 840 of FIG. 8B.

More specifically, Eq. (11) is obtained as follows. First, note that a junction is by definition a linear superposition of wedge patterns and that a step-edge pattern $H^{SE}(q, \psi, v_1, v_2, \sigma_b)$ is also a sum of wedge patterns:

$$H^{SE}(q, \psi, v_1, v_2, \sigma_b) = v_1 H^{Wdg}(q, -\Phi, \psi, \sigma_b) + v_2 H^{Wdg}(q, \psi, -\psi, \sigma_b),$$

so that the difference between a junction pattern and a step-edge pattern (with the same vertex and blur scale) is a sum of wedge patterns. Then, modify this sum of wedge patterns as follows. Let $v_l H^{Wdg}(q, \psi_l, \psi_{l+1})$ be the wedge in the sum which is split by the semi-line 819 with orientation $-\phi_k$. 1) Replace this wedge with the two wedges $(v_l - v_k) H^{Wdg}(q, \psi_l, -\psi_k)$ and $(v_l - v_{k-1}) H^{Wdg}(q, -\psi_k, \psi_{l+1})$; 2) eliminate the two wedges adjacent to the branch $\psi_k$ (812 and 814). Thus 3 wedges are eliminated are 2 new ones are added, yielding a sum of N−1 adjacent wedges whose N branch orientations, denoted $\tilde{\psi}_1, \ldots, \tilde{\psi}_N$ are given by:

$$\psi_{k+1}, \ldots, \psi_l, -\psi_k, \psi_{l+1}, \ldots, \psi_{k-1};$$

and whose coefficients, denoted $\tilde{v}_1, \ldots, \tilde{v}_{N-1}$ are given by:

$$v_{k+1} - v_k, \ldots, v_l - v_k, v_l - v_{k-1}, \ldots, v_{k-2} - v_{k-1}.$$

To reduce the dimensionality further, the wedge-decomposition (11) is rewritten as a linear combination the wedges $H^{Wdg}(q, \tilde{\psi}_{k'}, -\psi_k, \sigma_b)$ and $H^{Wdg}(q, -\psi_k, \tilde{\psi}_{k'}, \sigma_b)$, which have one branch with orientation fixed at $-\psi_k$. For example, with reference to FIG. 8B, this further step replaces the wedge 816 with the difference between the wedge comprised between 815 and 819 and the wedge 830. Thus, one finally obtains the following expression for the interference signal:

$$\Delta_k^{(JN)}(q, \underline{\psi}, \underline{v}, \sigma_b) = \sum_{k'=1}^{N-1} b_{k,k'} \tilde{H}^{Wdg}(q, -\psi_k, \alpha_{k,k'}, \sigma_b), \quad (12)$$

where $\alpha_{k,k'} = \tilde{\psi}_{k'} - (-\psi_k)$; $\tilde{H}^{Wdg}$ is given by Def. 29; and $b_{k,k'}$ are suitable linear combinations of the $\tilde{v}_l$, hence, of $\underline{v}$. Notice that each term in the sum depends on the parameter of the step-edge pattern on which the interference is being calculated, and on three additional variables: the linear coefficient $b_{k,k'}$; the angle $\alpha_{k,k'}$; and one extra variable to specify the position of the point q on the step-edge line.

Reference Descriptors and Prediction

Step 213 generates an ensemble of reference descriptors, typically one for every reference pattern of the specified model. A set of reference descriptors that is jointly used, e.g, for parameter estimation, is called a clique of reference descriptors and is denoted $r(\theta) = (r_1(\theta), \ldots, r_K(\theta))$. A clique may contain one element only. The map r, which maps model instances to the corresponding cliques of reference descriptors, is called reference map.

In some preferred embodiments, the ensemble of reference descriptors is obtained by predicting the output of the generators of auxiliary descriptor (provided at step 212) to the ensemble of reference patterns (provided at step 211). If $f_k$ is the descriptor map of one of these auxiliary descriptor generators, then its predicted descriptor corresponding to a reference pattern $H(\theta)$ is typically given by $f_k(H(\theta))$ or, if the support $U_k$ is made explicit, by $f_k(H(U_k; \theta))$. The map $f_k \circ H$ is called prediction map. A clique of reference descriptors is then given by:

$$r(\theta) = (f_1(H(\theta)), \ldots, f_K(H(\theta))) = (f \circ H)(\theta).$$

A clique of reference descriptors may originate from a fragmentation of the specified pattern, in which case the $f_k$ are the estimators for the local patterns $F_k(U_k; \phi_k)$. In this case, the reference descriptors can be written in terms of the interference shifts $s_k(\theta)$, defined to be the difference between the reference descriptor, i.e., the response to the reference pattern, and the local descriptor, i.e., the response the to the local pattern: $s_k(\theta) \underline{\Delta} r_k(\theta) - f_k(F_k(U_k; \phi_k))$; or, if a local parameterization is used:

$$s_k(\theta) \underline{\Delta} r_k(\theta) - f_k(F_k(U_k; \theta_k)) = f_k(H(U_k; \theta)) - f_k(F_k(U_k; \theta_k)) \quad (13)$$

A clique of reference descriptors given by a clique of predicted descriptors may be augmented with the corresponding sensitivity matrix $\Sigma(\theta)$, given by (5) or by (6). If the input signal I contains the ideal signal pattern $H(\theta)$ distorted with additive Gaussian noise having power σ, and if σ, is sufficiently small so that the descriptor maps can be linearized, then $\sigma\Sigma(\theta)$ is the covariance of the generated descriptors. This fact is used by some closed-loop optimal estimators described in a forthcoming section.

In general, if $r(\theta)$ and $\Sigma(\theta)$ are not sufficient to characterize the conditional probability distribution of the descriptors given the model parameter θ, then one may have to use multiple reference descriptors for each reference pattern and each generator or other more sophisticated representations of the conditional distribution (this approach is not pursued further in this disclosure).

In some preferred embodiments, unless the reference map r can be approximated by an explicit expression, a plurality of reference descriptors is obtained by simulating the descriptor generator on a set of reference patterns. Because of the computational resources required, this is typically performed offline.

Linearization of the interference shifts Provided that fragmentation has been performed so that the interference signals between the fragments is sufficiently small, each estimator map $f_k$ can be linearized $$f_k(H(\theta)) \approx f_k(F_k(U_k; \theta_k)) + \nabla f_k(F_k(U_k; \theta_k)) \cdot \Delta_k(\theta), \quad (14)$$

which yields the linearized interference shift:

$$s_k(\theta) = s_k(\theta_1, \ldots, \theta_K) \approx \nabla f_k(F_k(U_k; \theta_k)) \cdot \Delta_k(\theta). \quad (15)$$

Furthermore, if the interference signals $\Delta_k(\theta)$ are also linearized, e.g., if the reference pattern $H(\theta)$ is (or is approximated by) a linear superposition then one obtains a 2-valency (bivalent) representation of the interference shifts:

$$s_k(\vartheta) = \sum_{k' \neq k} s_{k,k'}^{(2)}(\vartheta_k, \vartheta_{k'}), \quad (16)$$

where $$s_{k,k'}^{(2)}(\theta_k, \theta_{k'}) \underline{\Delta} \nabla f_k(F_k(U_k; \theta_k)) \cdot F_{k'}(U_k; \theta_{k'}) \quad (17)$$

are the 2-valency interference shifts.

Calculation of the interference shifts Unless analytical methods can be used, preferred embodiments of the invention use offline simulation of the descriptor maps $f_k$ to calculate the interference shifts. A general approach is to use the definition given by Eq. (13). Notice that this calculation involves the comparison of a "top" reference descriptor, representing the response to the "global" reference signal $H(\theta)$, with a "bottom" local descriptor, representing the response to the local signal $F_k(\theta_k)$.

The 2-valency shifts, applicable with the linearized representation of $\Delta_k(\theta)$, can be obtained by (17), or by the following formula that avoids the differentiation of $f_k$:

$$s_{k,k'}^{(2)}(\theta_k, \theta_{k'}) = f_k(F_k(U_k; \theta_k) + F_{k'}(U_k; \theta_{k'})) - f_k(F_k(U_k; \theta_k)) \quad (18)$$

This formula consists in calculating the "leak" of the k'-th fragment into the k-th subdomain, given by $F_{k'}(U_k; \theta_{k'})$, and then to add it to the "base" signal $F_k(U_k; \theta_k)$ to evaluate how much the leak displaces the reference descriptor.

The nodes in a dependency graph representing a particular fragmentation must have sufficiently high spatial density so that the linearization assumptions hold for at least one of the nodes. Moreover, multiple domain and submodel configurations may have to be used, as illustrated by the examples in FIGS. 6 and 7.

Figure 9:
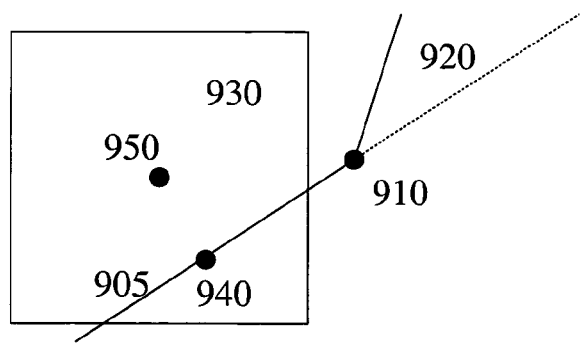
FIG. 9 illustrates the calculation of the interference shifts within a junction pattern.

Interference shifts of junction models The interference shifts for the junction model can be obtained from the linear representation of the interference signals, given by Eq. (12), and from Eq. (18). The resulting interference shift on the k-th step edge pattern is a sum of terms which are proportional to $s(\psi_k, \rho_k, \sigma_b, d_k, \alpha_{k,k'})$, where, by referring to FIG. 9, the pair $(\psi_k, \rho_k)$ specifies the k-th step edge line 905; $\alpha_{k,k'}$ is the angle of the sector 920, as in Eq. (12); and $d_k$ is the distance from a reference point on the k-th step edge line (for example, 940) to the vertex 910. The square region 930 is the domain of the SE pattern, having center 950. The coefficient of proportionality is either $b_{k,k'}$, (for the values $v_1$ and $v_2$) or $$\frac{b_{k,k'}}{a_k}$$

(for the other three components of the parameter).

Therefore, junction estimators are obtained by calculating the interference shifts $s(\psi, \rho, \sigma_b, d, \alpha)$ according to the method disclosed herein. To enforce the constraint, several methods can be used. For example, $\theta_{k'}.q=\theta_k.q$ can be enforced by determining the "center of gravity" of the pairwise intersection points between the edge lines; the other constraints can be enforced by simply calculating weighted averages of the corresponding variables.

Estimators Based on Optimization and on Reference Descriptors

According to one aspect of the invention, estimation of a model instance is carried out based on an appropriate optimization criterion that, in general, depends on the particular task performed and the model been recognized. For example, one simple and generally applicable optimization criterion is to minimize the norm signal residual, that is, the square difference between a block of the input signal I(U) and a reference signal pattern H(U; θ). While the optimal estimate specified by this criterion may be appropriate in a variety of situations, it is typically hard to obtain because of the high dimensionality of the model parameter θ.

According to the teachings of this invention, one or more layers of auxiliary intermediate models, e.g. obtained through the fragmentation procedure, and the corresponding ensemble of reference descriptors are utilized to simplify the optimization problem. One approach is to replace the ground-level optimization criterion, based on the difference between reference signals and input signal, with a reduced cost function based on descriptor discrepancies. These discrepancies are typically differences between reference descriptors calculated "top-down" and online descriptors calculated "bottom-up". For example, one optimization criterion is to minimize the combined descriptor discrepancy: $\Sigma_{k=1}^{K} \|f_k(H(U_k; \theta))-f_k(I(U_k))\|^2$. A more general optimization criterion is obtained by introducing a suitable weight matrix, which yields a cost function quadratic in the descriptor discrepancies. Indeed, the closed-loop estimator disclosed in a forthcoming section and represented by path 204 in FIG. 2 are based on a quadratic reduced criterion of this type.

A special case is obtained when the combined dimensionality of the auxiliary descriptors (that is, the dimensionality of the clique) is equal to the dimensionality of the estimated model. Then, the reference map is invertible and the reduced optimization criterion boils down to the reference equation $r(\theta)=\gamma$, where γ is the online clique of descriptors. Estimators based on lookup table (path 202) are based on this approach (see the next section). The interference-based estimators (path 203) are also based on a reference equation obtained by providing a local parameterization of the model and a set of constraints on the resulting concatenated parameter.

A model to be recognized may be represented by multiple layers of reference descriptors, each yielding a reduced optimization criterion. An estimate for the model may be obtained through cooperation among these layers. For example, in a coarse-to-fine strategy, the highest levels are used first to provide an initial estimate; then this estimate is propagated down to the level below to initialize the search for a lower-level estimate. This may continue all the way to the ground-level, thus obtaining eventually an estimate that minimizes the signal residual.

The examples of optimization criteria just discussed are based on least-squares and maximum-likelihood estimation. The same methodology can also be applied to more sophisticated estimation criteria, such as maximum a-posteriori (MAP) estimation.

Estimators Based on Lookup Tables

In some embodiments, the reference map r, obtained by means of prediction, r=f∘H, can be inverted and its inverse is denoted $r^{-1}$. This inverse map is defined on r(Θ), which is the set of "reference" cliques r(Θ) that can be obtained by a parameter Θ∈Θ. An estimator is then obtained which is represented by the estimation map $r^{-1} \circ f$, where $f=(f_1, \ldots, f_K)$ is the concatenation of the descriptor maps of the auxiliary generators. In some embodiments, the estimation map is given by $r^{-1} \circ \pi \circ f$, where π represents a suitable operator that projects a clique of online descriptors onto the set of reference cliques r(Θ)).

If the projection Σ is not necessary, then the estimation map, $r^{-1} \circ f$ annihilates the descriptor discrepancies. Indeed, since r=f∘H, the estimate $\hat{\theta}=(r^{-1} \circ f)$ (I) satisfies (f∘H)($\hat{\theta}$)= (f∘H∘$r^{-1}$∘f) (I)=f(I), so that $f_k(H(\hat{\theta}))=f_k(I)$ for all the elements of the clique. That is, the online descriptor $f_k(I)$ is equal to the reference descriptor $f_k(H(\hat{\theta}))$, so that the total descriptor discrepancy is zero.

Moreover, if the input signal contains an ideal instance of the model, I(U)=H(U; V), and if U contains the supports of all the $f_k$, then we see that $\hat{\theta}$=and θ h∘H=id; that is, the estimator recovers ideal model instances exactly. It is then said to be centered.

Estimators of this type can be implemented by associative maps or lookup tables. To construct such an estimator, references descriptors are typically obtained by sampling the parameter space Θ, yielding $\Theta_{qtz}$, and by simulating the generators of auxiliary descriptors on the sampled reference patterns. This yields a non-uniform grid or mesh of parameter values: $r(\Theta_{qtz})$. Then, in some embodiments, this mesh is rectified offline by solving the equation $r(\theta)=\gamma_{qtz}$ for all $\gamma_{qtz}$ belonging to a uniform grid of values. This yields a multi-dimensional array implementation of the estimator, which performs extremely fast during the online stage. Interpolation can also be implemented by storing the appropriate Jacobian matrices.

Other methods that do not require rectification are based on computational geometry algorithms such as the QHull algorithm. For example, a method is to seek the simplex of $r(\Theta_{qtz})$ that contains the point γ=f(I) (or the nearest simplex if no containing simplex exists), and then to estimate $r^{-1}(\gamma)$ by interpolating the values at the vertices of the simplex.

Hybrid estimators based on lookup tables and closed-loop iterations The memory requirements for a lookup table estimator can be substantial if very high accuracy is required. To reduce these memory requirements a coarse grid is used rather than a fine one, and the estimate is further refined by linearizing the reference equation, yielding the autonomous iterative estimator:

$$\theta^{t+1} - \theta^t = R^{-1}(\theta^t) \cdot (\gamma - r(\theta^t)),  \quad (19)$$

where R is the derivative of the reference map r and the initialization $\theta = \theta^0$ is obtained by using the coarse lookup table.

Lookup Table Estimators for Step Edge (SE) Patterns

To illustrate the lookup table approach, the following is a procedure to construct an estimator for SEc models.

Estimation construction stage
1. Select a domain U;
2. fragment each pattern $H^{SE}(U; \theta^{SE})$ into a P30 patterns $H^{P30}(U_1; \theta^{P30})$;
3. construct a P30 estimator $f^{P30}$ with support $U_1$;
4. Specify a finite grid of points, denoted $\Theta_0^{SE}$, in the three-dimensional subspace of $\Theta^{SE}$ identified by the constraints $v_0 = 0$ and $a = 1$;
5. Simulate $f^{P30}$ on each $H(U; \theta^{SE})$, $\theta^{SE} \in \Theta_0^{SE}$, to yield an ensemble of reference P30 descriptors. There is no need to vary the parameter components $v_0$ and a because the predicted descriptor is linear on these. Indeed (see Def. 4), $$r(a'\theta + v'_0) = a'r(\theta) + v_0',  \quad (20)$$

so that $$r(\psi, \rho, \sigma_b, a, v_0) = ar(\psi, \rho, \sigma_b, 1, 0) + v_0.  \quad (21)$$

6. Construct a three dimensional lookup table representing the inverse of the discretized prediction map.
7. For each point $\theta^{SE} \in l_0^{SE}$, calculate the sensitivity matrix $\Sigma(\theta^{SE})$, and other performance parameters, such as the expected residual as a function of the noise level, etc. Determine the validity region for the constructed estimator;
8. Repeat for another domain shape (no need to repeat for translated domains) and size. Then select a collection of domains with sufficient density to ensure that the whole parameter space $\Theta^{SE}$ is covered.

Signal processing (online) stage The following steps are performed to calculate an estimate $\hat{\theta}^{SE}$.
1. Select a signal block I(U) and calculate $\hat{\theta}^{P30}$ with the appropriate P30 estimator, $\hat{\theta}^{P30} = f^{P30}(I)$;
2. From $\hat{\theta}^{P30}$, determine the $\psi, \rho, \sigma_b$ components of $\hat{\theta}^{SE}$ by means of the appropriate lookup table;
3. Calculate the a and $v_0$ components of $\hat{\theta}^{SE}$ by using equation (21);
4. Check that $\hat{\theta}^{SE}$ is within the validity region; calculate the residual signal $H^{SE}(U; \hat{\theta}^{SE}) - I(U)$ to assess detection performance (e.g., probability of false-alarm, etc.); estimate parameter uncertainty intervals from sensitivity matrix;
5. Validate or reject the estimated model instance based on above.

As noted earlier this method only applies to the model SEc. Instances of the type SEnc, which may be necessary for the estimating JN patterns, can be estimated through a layer of nodes linked to the SEc layer. A basic method is to simply "import" the parameter from a nearby SEc instance. A more refined methods is to calculate a weighted average from the nearest SEc instances.

Closed-Loop Estimators

A typical incremental closed-loop estimator is characterized by the following update formula, executed at step 258 of FIG. 2:

$$\theta^{t+1} - \theta^t = G(\theta^t) \cdot (\gamma - r(\theta^t))  \quad (22)$$

where $\theta^t$ is the current estimate for the model parameter; $G(\cdot)$ is a gain matrix; $\gamma - r(\theta^t)$ is the descriptor discrepancy between the clique of online descriptors $\gamma$ and the clique of reference descriptors $r(\theta^t)$, obtained by steps 251, 254, and 256 of FIG. 2. In some embodiments, the gain matrix is specified so as the above iterative formula optimizes a least-squares or a (linearized) Maximum Likelihood criterion, e.g.:

$$G = (R^T \Sigma^{-1} R)^{-1} R^T \Sigma^{-1},  \quad (23)$$

where R is the derivative of the reference map and $\Sigma$ is a covariance matrix or a weight matrix. In some embodiments, $\Sigma$ is given by Eq. (5) or Eq. (6) or, for the sake of simplicity, the identity matrix.

In other embodiments $\Sigma$ is block diagonal so that (22) can be written as a sum over the descriptors in the clique:

$$\vartheta^{t+1} - \vartheta^t = \sum_{k=1}^{K} G_k(\vartheta^t) \cdot (\gamma_k - r_k(\vartheta^t)),  \quad (24)$$

where $G_k(\cdot)$ is given by: $G_k = (\Sigma_{k'=1}^{K} R_{k'}^T \Sigma_{k'}^{-1} R_{k'})^{-1} R_k^T \Sigma_k^{-1}$. This form is appropriate if, for example, the generators are independent of each other, e.g. if their supports $U_k$ do not overlap.

A closed-loop estimator may be appropriate when the available covariance or sensitivity matrix contains significant information that must be taken into account.

Constrained parameter space When the model parameter W is subject to constraints, e.g. $\Theta = \{\theta: z(\theta) = 0\}$, the following alternating form of the update rule may be used:

$$\theta^{t+1} - \theta^t = P_\Theta(\theta^t) \cdot G(\theta^t) \cdot (\gamma_k - r_k(\theta^t))  \quad (25)$$

where $P_\Theta = 1 - Z(Z^t Z)^{-1} Z^t$ is the constraint-enforcing operator that projects on $\Theta$, and Z is the Jacobian of z.

Estimators Based on Interference Compensation

Estimators utilizing interference shifts are now disclosed. Typical embodiments of these estimators utilize a locally parametrized fragmented model and alternate a step in which constraints are neglected and a step that enforces constraints. For example, if the constraint-free step is perform first, then the following iterative alternating estimator results:

$$\theta^{t+1} = P_\Theta(\theta^t)(\phi - s(\theta^t)), \theta^0 = \phi  \quad (26)$$

where $\phi = (\phi_1, \ldots \phi_K)$, $\phi_k = f_k(I(U_k))$, is a clique of online descriptors representing estimates of the fragments' parameters; $\theta = (\theta_1, \ldots, \theta_K)$ is the model parameter of the fragmented model; $s(\theta^t)$ are interference shifts; and the generators $f_k$ are assumed to be centered estimators: $f_k \circ F_k = \text{id}$. Because of the initialization $\theta^0 = \phi$, this estimator is autonomous, rather than incremental. If instead the constraint-enforcing step is performed first: $\theta^{t+1} = \phi - s(P_\Theta(\theta^t))$.

Notice that the constraint-free step $\theta^{t+1}=\phi-s(\theta^t)$ is derived from the reference equation $r(\theta)=\phi$ written in the form $\theta+s(\theta)=\phi$. This special form was in turn obtained from Eq. (13) through the assumption $f_k \circ F_k = id$.

Searching for Model Instances

Embodiments of the present invention provide the flexibility to organize and perform the search for model instances based on requirements of the specific application and on possible requests by the user. Step 251 in FIG. 2 organizes and performs the search by obtaining a clique of online descriptors and a corresponding localized descriptor generator, denoted (U, h), that can be executed on it. The online clique can be a generic set of descriptors, denoted $\gamma$; a clique of local parameters, denoted $\phi$; or a signal block I(U). The generator may be either a generic descriptor generator or an estimator for a model, which can be one of the models that have to be ultimately recognized or an auxiliary intermediate model. The order in which the online clique and the generator are obtained may vary, as further described below.

The online descriptors and the descriptor generators may be organized into a dependency graph that keeps track of which localized generators have enough auxiliary descriptors to execute and, conversely, which auxiliary descriptors or local models need to be estimated for enabling a particular model estimator to execute.

model→online descriptors In a top-down search mode, a model to be recognized is selected first and then a clique of online descriptors is obtained that provides aiding information for estimating the selected model. This mode is used when, for example, the recognition system is instructed to search for instances of a particular model.

online descriptors→generator In a bottom-up descriptor-driven search mode, a clique of online descriptors is obtained first and then a generator is selected which is enabled by this clique. For example, online descriptors may be stored in a cache along with a "saliency" or "priority value" qualifier. Then, at a particular point during online signal processing, a clique of most salient descriptors may be selected from the cache. For example, this mode may be utilized if no particular model is being sought and the input signal is being explored to find instances of any recognizable model. Alternatively, this mode is appropriate when the model being sought can be recognized in multiple ways, that is, through many possible chains of intermediate auxiliary descriptors, so that all the components of the alternative decompositions of the model need to be sought simultaneously.

domain→online descriptors→model In domain-driven search modes, a domain U or a signal block I(U) is selected first. Raster-like scanning methods select domains by visiting, in a predetermined order, a sufficiently dense set of domains spanning the whole signal, possibly at a plurality of scales. Alternatively, the user may provide hints as to where to "focus" the search. Then, a clique of online descriptors localized within the selected domain and a corresponding generator are obtained.

Evaluating the Candidate Model Instance

Step 259 evaluates the match between the candidate model instance and the input signal. As a result, the candidate model instance may be validated or it may be rejected.

One group of evaluation methods focuses primarily on the estimated model parameter $\hat{\theta}=h(I(U))$. Another group of methods utilizes also a calculated discrepancy measure between the candidate model instance and the input signal. For example, this discrepancy may be given by the the) norm of the signal residual: $I(U)-H(U;\hat{\theta})$. Evaluation methods can also be differentiated based on whether they require knowledge about the noise level $\sigma$ or not.

Assessing parameter uncertainty If an estimate for a is available, then the covariance matrix associated with h can be obtained and used to determine uncertainty intervals for each component of the model parameter $\theta$. If the uncertainty interval for one, some or most of these components (depending on the problem requirements) is too large then the candidate model instance may be rejected.

Embodiments of the invention check if a parameter estimate $\hat{\theta}$ is within the validity region of the estimator by which it was generated. The sensitivity matrix $\Sigma$ may be calculated during the offline stage for a dense sample of model parameter values so as to determine this validity region.

Another methodology compares the actual sensitivity matrix (5) with the optimal one given by (6) so as to determine the loss associated with the particular estimator used. Parameter values yielding a significant loss may be excluded from the validity region of the estimator.

The offline stage may also compare the sensitivity matrices of different estimators for the same model, so as to select the best estimator.

Typically, a new descriptor is generated to represent a validated model instance. This descriptor may then be stored in a cache, delivered to an external receiver (e.g. a user performing a task), or utilized to estimate another model instance.

Using the signal residual The residual norm (or any other equivalent metric) provides additional information for evaluating and qualifying the candidate model estimate. The typical assumption is that the residual is a realization of a noise process some characteristics of which are known. For example, the noise may be known to be an identically independently distributed Gaussian process. The power a of the process may or may not be known.

If $\sigma$, is not known, then measuring the residual norm for one or more candidate model instances may provide a bound for $\sigma$. For example, if the residual norm is very small, then it may be concluded that it is unlikely that the noise power is higher than a certain level. To provide a quantitative basis for this method, the offline stage generates a sample of the noise process to obtain a probability distribution for the residual norm conditional on the null hypothesis. This probability distribution is then used to determine the confidence with which a particular candidate model instance can be validated, that is, the confidence with which the null hypothesis (that the match is purely cause by noise) can be ruled out.

In general, a candidate model instance can be qualified with an uncertainty interval for a (for a given confidence value) that provides a range of possible noise levels that are consistent with the candidate model instance.

If $\sigma$ is known, then it is possible to use the residual norm to perform a conventional detection test in which a suitable threshold on the residual norm is applied to decide whether the candidate model instance should be accepted or rejected. Alternatively, the model estimate may be unconditionally accepted after have been qualified with a probabilistic parameter describing the likelihood (or some other confidence-based likelihood bound) that the model estimate is a genuine one ("soft" detection test).

Updating the Online Descriptor Cache

Typical embodiments of this invention maintain a cache of descriptors. Step 259 updates this cache by inserting new descriptors, by comparing descriptors, and also by removing descriptors that are redundant or which are no longer needed.

When two descriptors containing similar information are found in the cache, one of them may be removed. These are some factors that are considered to decide if one (and which one) should be removed:
- the discrepancies of the descriptors with respect to the input signal;
- the size of their uncertainty intervals;
- their complexities as measured, for example, by the number of components, the amount of memory required for storage, or by some entropy-like measure;
- the degree by which each descriptor is subsumed by the other descriptor or by another descriptor in the cache;
- the amount of computational and memory resources available.

If a first descriptor subsumes a second one and its discrepancy is not worse, then the second descriptor is typically discarded. If subsumption is only approximate, then the second descriptor may be kept if sufficient memory resources are available. In some embodiments, the second descriptor may be stored in a compressed form to reduce memory usage. If the first descriptor approximately subsumes the second, then the second one can be efficiently compressed based on the information contained in the first descriptor.

If a first descriptor subsumes a second descriptor but has a significantly worse discrepancy, then it is typically discarded while the second one is kept. If however the discrepancy of the first one is only slightly worse, then the first one may be kept as well, if its complexity is not much larger than the complexity of the second descriptor. In some embodiments, one objective is to store only a minimal number of descriptors having minimal complexity and discrepancy, and which subsume all the other descriptors that have been generated.

GENERALIZATIONS AND OTHER EMBODIMENTS

Weighted Superposition and Interpolation

Some of the embodiments disclosed in the previous section were based on compositional models obtained through weight-free linear superposition. A more sophisticated linear compositional method utilizes a set of weight signals Wk(p; 9) to obtain the linear superposition. The interference signals and the linearized interference shifts are then given by:

$$\Delta_k(\vartheta) = (W_k(\vartheta) - 1)F_k(\vartheta_k) + \sum_{k' \neq k} W_{k'}(\vartheta)F_{k'}(\vartheta_{k'}),$$

$$s_k(\vartheta) \approx \nabla f_k(F_k(\vartheta_k))(W_k(\vartheta) - 1)F_k(\vartheta_k) + \sum_{k' \neq k} W_{k'}(\vartheta)F_{k'}(\vartheta_{k'}).$$

where the signals on the right-hand side are all localized to $U_k$.

An interpolated superposition is obtained if the weights form a partition of unity of the signal domain, that is:

$$\sum_{k=1}^{K} W_k(p;\vartheta) = 1, \ \forall p, \ \forall \vartheta.$$

Interpolation methods can be used to construct composite patterns by smoothly juxtaposing component patterns next to each other, e.g. along "switching lines", or also by layering patterns on top of each other, for example, to represent occlusion.

The interference signals and the linearized interference shifts for an interpolation are given by:

$$\Delta_k(\vartheta) = \sum_{k' \neq k} W_{k'}(U_j;\vartheta) dF_{k',k}(U_k;\vartheta_{k'},\vartheta_k), \quad (27)$$

$$s_k(\vartheta) \approx \nabla f_k(F_k(U_k;\vartheta_k)) \cdot \sum_{k' \neq k} W_{k'}(U_j;\vartheta) dF_{k',k}(U_k;\vartheta_{k'},\vartheta_k),$$

where $dF_{k',k}(U_k;\theta_{k'},\theta_k)=F_k(U_k;\theta_{k'})-F_k(U_k;\theta_k)$; the product between the two column vectors in the above sums is to be intended as entry-by-entry (likewise in the similar expressions below).

Notice that the contribution of a fragment k' to the interference on another fragment k is large only if $W_k$ and $dF_{k',k}$ are simultaneously "large" at some locations of the fragment's subdomain U. Hence, a strategy to keep interference small is to design the subdomains, the weights, and the constraints on the local parameters so that $W_k$ and $dF_{k',k}$ are never (or only sparsely) simultaneously large. For example, this condition is satisfied if the subdomains of the fragmentation have small overlap, or if the local patterns are constrained to be close to each other on the overlap.

Normalized independent weights One particular method to construct interpolated patterns is by means of normalized independent weights, whereby some initial weights $W_k(\theta_k)$, each depending on one local parameter only, are normalized to unity, to yield:

$$H(\vartheta) = \left(\sum_{l=1}^{K} W_l(\vartheta_l)\right)^{-1} \sum_{k=1}^{K} W_k(\vartheta_k)F_k(\vartheta_k).$$

The main difference from a weight-free linear superposition is the coupling between the local components, which is due to the normalization.

Low-valency expansion: the 2-occupancy approximation According to another aspect, the compositional model is constructed (and fragmented) so that a low-valency expansion is possible. One method is to utilize the 2-occupancy approximation. For a NIW-interpolation this is given by:

$$\frac{W_{k'}(p;\vartheta_{k'})}{\sum_{l=1}^{K} W_l(p;\vartheta_l)} \approx \frac{W_{k'}(p;\vartheta_{k'})}{W_k(p;\vartheta_k) + W_{k'}(p;\vartheta_{k'})} \triangleq W_{k'}^{(2)}(p;\vartheta_{k'},\vartheta_k), \ \forall p \in U_k. \quad (28)$$

This yields a 2-valency approximation of the interference signal:

$$\Delta_k(\vartheta) \approx \sum_{k' \neq k} W_{k'}^{(2)}(U_k;\vartheta_{k'},\vartheta_k) dF_{k',k}(U_k;\vartheta_{k'},\vartheta_k); \quad (29)$$

and, consequently, a 2-valency approximation of the interference shifts, which are then given by sums of the bivalent shifts:

$$s_{k,k'}^{(2)}(\theta_k,\theta_{k'})=\nabla f_k(F_k(U_k;\theta_k))\cdot(W_{k'}^{(2)}(U_k;\theta_{k'},\theta_k)dF_{k',k}(U_k;\theta_{k'},\theta_k)) \quad (30)$$

To obtain the 2-occupancy approximation, the sub-domains and the weights are chosen so that each point inside the sub-domain $U_k$ is "occupied" by at most one interfering component, in addition to the "native" $F_k$. Which one of the fragments is interfering may vary from point to point, but it is required that no more than one interfering fragment be "active" at the same location.

Interference Compensation, 1-ST Order Method

A more elaborate method for interference compensation is obtained by calculating a Taylor expansion from $\theta^t$ to $\theta^{t+1}$ of the reference map r=1+s:

$$r(\theta^{t+1})=r(\theta^t)+(1+S(\theta^t))\cdot(\theta^{t+1}-\theta^t),$$

where $S(\cdot)$ is the derivative matrix of the interference shift $s(\cdot)$ and $1+S(\cdot)$ is the derivative of $r(\cdot)$, based on the assumption that the $f_k$ are centered. The reference equation $r(\theta^{t+1})=\phi$ then becomes:

$$r(\theta^t)+(1+S(\theta^t))(\theta^{t+1}-\theta^t)=\phi.$$

By substituting $r(\theta^t)=\theta^t+s(\theta^t)$, and using again the initialization $\theta^0=\phi$, we get the alternating autonomous iterative estimator:

$$\theta^{t+1}-\theta^t=P_\Theta(\theta^t)(1+S(\theta^t))^{-1}\cdot(\phi-\theta^t-s(\theta^t)). \quad (31)$$

If only one iteration is performed we get the direct estimator:

$$\hat{\theta}=\phi-P_\Theta(\phi)(1+S(\phi))^{-1}\cdot s(\phi).$$

Notice that while the 0-th order interference compensation for a local parameter $\theta_k$, given by Eq. (26), depends only on the interference shift $s_k$ for that parameter (except for the constraint enforcement step), in the first-order estimator (31) the interference shifts for all the local parameters are coupled.

REFERENCES

[1] A. Witkin. Scale-space filtering. In Int. Joint Conf. on Artif. Intell., pages 1019-1022, 1983.
[2] J. Canny. A computational approach to edge detection. IEEE Transactions on Pattern Analysis and Machine Intelligence, 8(6):679-698, 1987.
[3] R. Hartley and A. Zissermann. In Multiple View Geometry, Cambridge U. Press, 2000, pages 597-627.
[4] U.S. Pat. No. 5,170,440 Cox; Ingemar J. Perceptual grouping by multiple hypothesis probabilistic data association NEC Research Institute, Inc.
[5] U.S. Pat. No. 6,690,842 Silver; William (Weston, Mass.); Garakani; Arman (Wellesley, Mass.); Wallack; Aaron (Natick, Mass.) Apparatus and method for detection and sub-pixel location of edges in a digital image Cognex.
[6] U.S. Pat. No. 6,408,109 Apparatus and method for detecting and sub-pixel location of edges in a digital image Cognex
[7] U.S. Pat. No. 5,987,172 Edge peak contour tracker Cognex
[8] U.S. Pat. No. 5,933,529 Method of tracing a contour of an object based on background information of the object Daewoo Electronics Co., Ltd. (Seoul, KR)
[9] U.S. Pat. No. 5,881,170 Contour extraction apparatus Matsushita
[10] U.S. Pat. No. 5,210,799 System and method for ranking and extracting salient contours for target recognition Texas Instruments Incorporated (Dallas, Tex.)
[11] U.S. Pat. No. 4,771,469 Honeywell Inc. Means and method of representing an object shape by hierarchical boundary decomposition
[12] S. Baker, S. K. Nayar, and H. Murase. Parametric feature detection. *IJCV*, 27:27-50, 1998.
[13] S. Casadei and S. K. Mitter. A hierarchical approach to high resolution edge contour reconstruction. In *Proceedings of the IEEE Conference on Computer Vision and Pattern Recognition*, pages 149-153, 1996.
[14] S. Casadei and S. K. Mitter. Hierarchical image segmentation—part i: Detection of regular curves in a vector graph. *International Journal of Computer Vision*, 27(3): 71-100, March 1998.
[15] S. Casadei and S. K. Mitter. An efficient and provably correct algorithm for the multiscale estimation of image contours by means of polygonal lines. *IEEE Trans. Information Theory*, 45(3), April 1999.
[16] R. Deriche and T. Blaszka. Recovering and characterizing image features using an efficient model based approach. In *Proceedings of the IEEE Conference on Computer Vision and Pattern Recognition*, Jun. 15-18, 1993.
[17] R. Deriche and G. Giraudon. Accurate corner detection: An analytical study. *ICCV*, 90:66-70, 1990.
[18] J. H. Elder and S. W. Zucker. Local scale control for edge detection and blur estimation. In *European Conference on Computer Vision*, pages II:57-69, 1996.
[19] S. Geman and D. Geman. Stochastic relaxation, gibbs distributions, and the bayesian restoration of images. *IEEE Transactions on Pattern Analysis and Machine Intelligence*, 6:721-741, November 1984.
[20] U. Grenander. *General Pattern Theory: A Mathematical Study Of Regular Structures*. Oxford University Press, 1993.
[21] E. R. Hancock and J. Kittler. Edge-labeling using dictionary-based relaxation. *IEEE Transactions on Pattern Analysis and Machine Intelligence*, 12:165-181, 1990.
[22] R. Haralik. Digital step edges from zero crossing of second directional derivatives. *IEEE Transactions on Pattern Analysis and Machine Intelligence*, 6(1):5868, 1984.
[23] M. Isard and A. Blake. Icondensation: Unifying low-level and high-level tracking in a stochastic framework. In *ECCV98*, page I: 893, 1998.
[24] S. Mallat and Z. Zhang. Matching pursuits with time-frequency dictionaries. *IEEE Trans. on Signal Process.*, 12(41):3397-3415, 1993.
[25] J. Marroquin, S. K. Mitter, and T. Poggio. Probabilistic solution of ill-posed problems in computational vision. *Journal of American Statistical Ass.*, 82(397):76-89, March 1987.
[26] V. S. Nalwa and T. O. Binford. On detecting edges. *IEEE Transactions on Pattern Analysis and Machine Intelligence*, 8:699-714, 1986.
[27] P. Parent and S. W. Zucker. Trace inference, curvature consistency, and curve detection. *IEEE Transactions on Pattern Analysis and Machine Intelligence*, 11, August 1989.
[28] P. Perona. Deformable kernels for early vision. *IEEE Transactions on Pattern Analysis and Machine Intelligence*, 17(5):488-499, May 1995.
[29] K. Rohr. Recognizing corners by fitting parametric models. International Journal of Computer Vision, 9(3), 1992.
[30] J. Shi and J. Malik. Normalized cuts and image sementation. In *IEEE Computer Vision and Pattern Recognition*, pages 731-737, 1997.
[31] C. Steger. An unbiased detector of curvilinear structures. *T-PAMI*, 20(2):113-125, 1998.
[32] Z. Tu and S. C. Zhu. Image segmentation by data-driven markov chain monte carlo. *PAMI*, 24(5):657-673, May 2002.

[33] S. C. Zhu. Statistical modeling and conceptualization of visual patterns. *T-PAMI*, 25(6):691-712, June 2003.

[34] S. C. Zhu and A. Yuille. Region competition: Unifying snakes, region growing, and bayes/mdl for multiband image segmentation. *T-PAMI*, 18:884-900, 1996.

What is claimed is:

1. A method to recognize model instances in an input signal, the method comprising the steps of:
   storing in a long-term memory a hierarchical collection of models, wherein:
      the instances of each model are represented by an ensemble of patterns;
      a non primitive pattern, defined on a domain and representative of an instance of a non-primitive model from said hierarchical collection has a fragmentation comprising a clique of local patterns; and wherein
      each local pattern, defined on a sub-domain of said domain, is representative of a local model from said hierarchical collection and provides an approximate representation of said non-primitive pattern within said sub-domain;
   generating, by a processing means, a plurality of descriptors wherein each of said descriptors specifies an estimated pattern representative of an instance of a model detected in said input signal;
   storing said descriptors in a short-term memory;
   extracting from said short-term memory, by said processing means, a clique of descriptors which specifies a clique of estimated patterns;
   selecting a model to be recognized from said hierarchical collection; and
   generating, by said processing means, and by using said clique of descriptors as auxiliary descriptors, a new descriptor that specifies a new pattern, wherein said new pattern has a fragmentation given by said clique of estimated patterns and is representative of an instance of said model to be recognized.

2. The method of claim 1, wherein:
   each pattern is represented by a multidimensional parameter value;
   said fragmentation of said non-primitive pattern is obtained according a fragmentation rule for said non-primitive model which specifies a decomposition of the domain of said non-primitive pattern into a fixed clique of local domains and assigns a local model from said hierarchical collection to each one of said local domains;
   said fragmentation rule specifies a validity region such that an interference signal, given by the difference between said non-primitive pattern and said local pattern in said sub-domain, is sufficiently small whenever the multidimensional parameter value representing said non-primitive pattern belongs to said validity region;
   a sufficient number of fragmentation rules is provided for said non-primitive model so that any pattern of said non-primitive model is represented by a multidimensional parameter value belonging to the validity region of at least one fragmentation rule.

3. The method of claim 1, wherein said non-primitive pattern is a weighted sum of component patterns representative of instances of component models from said hierarchical collection, and wherein any one of said component patterns has a small interference signal inside the domain of any other one of said component patterns.

4. The method of claim 1, further comprising the step of adding said new descriptor to said short-term memory if a discrepancy measure associated to said new descriptor is sufficiently low.

5. The method of claim 1, further comprising the step of removing from said short-term memory any subsumed descriptor belonging to said clique of descriptors if a discrepancy measure of said new descriptor is sufficiently low relative to a discrepancy measure of said subsumed descriptor.

6. The method of claim 1, further comprising the step of:
   searching said short-term memory for a pair of descriptors consisting of a subsumed descriptor and a subsuming descriptor;
   removing said subsumed descriptor if a discrepancy-plus-complexity measure of said subsuming descriptor is sufficiently low relative to a discrepancy-plus-complexity measure of said subsumed descriptor.

7. The method of claim 1, wherein said model to be recognized is selected before said extracting step and said extracting step comprises the step of searching said short-term memory for descriptors which can be used as auxiliary descriptors for the estimation of said model to be recognized.

8. The method of claim 1, wherein said model to be recognized is selected after said extracting step and said model to be recognized is selected by searching said hierarchical collection for models which can be estimated by using said clique of descriptors as auxiliary descriptors.

9. The method of claim 1, further comprising the steps of selecting, by said processing means, a domain to examine from a pre-defined collection of domains and wherein:
   the domain of said new descriptor is substantially equal to said domain to examine;
   the union of the domains of said clique of descriptors contains a substantial portion of said domain to examine; and
   said model to be recognized is selected among the models of said hierarchical collection which can be estimated by using said clique of descriptors as auxiliary descriptors.

10. The method of claim 9, wherein two or more descriptors are generated whose domains are substantially equal to said domain to examine, and wherein said two or more descriptors specify instances of two or more distinct models from said hierarchical collection.

11. The method of claim 1, further comprising the steps of:
    storing a hierarchical collection of descriptor generators in said long-term memory;
    executing, by said processing means, one of said descriptor generators on a plurality of said patterns, to yield a plurality of predicted descriptors; and
    comparing one of said predicted descriptors with a descriptor stored in said short-term memory and representative of a model instance detected in said input signal.

12. The method of claim 11, wherein some of said predicted descriptors are generated during an off-line stage.

13. The method of claim 11, wherein some of said predicted descriptors are generated by said step of generating a new descriptor, to produce feedback signals utilized by an optimization algorithm that refines a multidimensional parameter value associated to said new descriptor.

14. The method of claim 1, wherein:
    said input signal is an input image, the domain of said patterns are two-dimensional image regions;
    said hierarchical collection comprises a plurality of polynomial models and a centered step-edge model;
    said non-primitive model is said centered step-edge model;
    said clique of local patterns includes a cubic edge pattern;
    said model to be recognized is said centered step-edge model;
    said clique of descriptors includes a cubic-edge descriptor calculated from said input image; and said new pattern is a step-edge pattern estimated by utilizing said cubic-edge descriptor as auxiliary descriptor.

15. The method claim 14, wherein:
said hierarchical collection further comprises a junction model and a non-centered step-edge edge model;
a first junction pattern has a fragmentation comprising a local centered step-edge pattern;
a second junction pattern has a fragmentation comprising a local non-centered step-edge pattern.

16. The method of claim 15, wherein an interference signal between said first junction pattern and said local centered step-edge pattern is expressed as a sum of wedge patterns.

17. The method of claim 1, wherein said input signal is an input image, said hierarchical collection comprises a plurality of polynomial models, a centered step-edge model and a non-centered step-edge model, and wherein said extracting a clique of descriptors, said selecting a model to be recognized and said generating a new descriptor are performed during a plurality of iterations, wherein:
in a first iteration, said clique of descriptors comprises a polynomial edge descriptor and said model to be recognized is said centered step-edge model;
in a second iteration, said clique of descriptors comprises a second polynomial edge descriptor and a constant-gradient descriptor whose domain is on one side of the domain of said second polynomial edge descriptor, and said model to be recognized is said non-centered step-edge model;
in a third iteration, said clique of descriptors comprises a third polynomial edge descriptor, a second and third constant-gradient descriptors whose domains are on opposite sides of said third polynomial edge descriptor, and said model to be recognized is said centered step-edge model.

18. An apparatus to recognize model instances in an input signal, comprising:
means for storing a hierarchical collection of models and a plurality of descriptors, wherein:
the instances of each model are represented by an ensemble of patterns;
a non-primitive pattern, defined on a domain and representative of an instance of a non-primitive model from said hierarchical collection has a fragmentation comprising a clique of local patterns; and wherein
each local pattern, defined on a sub-domain of said domain, is representative of a local model from said hierarchical collection and provides an approximate representation of said non-primitive pattern within said sub-domain;
and said apparatus further comprising processing means adapted to:
generate said plurality of descriptors, wherein each of said descriptors specifies an estimated pattern representative of an instance of a model detected in said input signal;
extract from said storing means a clique of descriptors which specifies a clique of estimated patterns;
select a model to be recognized from said hierarchical collection; and
generate, by using said clique of descriptors as auxiliary descriptors, a new descriptor that specifies a new pattern, wherein said new pattern has a fragmentation given by said clique of estimated patterns and is representative of an instance of said model to be recognized.

19. The apparatus of claim 18, wherein
said input signal is an input image, the domain of said patterns are two-dimensional image regions, said hierarchical collection comprises a plurality of polynomial models, a centered step-edge model, a non-centered step-edge model, and a junction model;
a first junction pattern has a fragmentation comprising a centered step-edge pattern,
a second junction pattern has a fragmentation comprising a non-centered step-edge pattern; and wherein
an interference signal between said first junction pattern and said centered step-edge pattern is expressed as a sum of wedge patterns.

20. A computer readable medium for use in an apparatus to recognize model instances, the computer readable medium containing:
encoded data representing a hierarchical collection of models, wherein:
the instances of each model are represented by an ensemble of patterns;
a non primitive pattern, defined on a domain and representative of an instance of a non-primitive model from said hierarchical collection has a fragmentation comprising a clique of local patterns; and wherein
each local pattern, defined on a sub-domain of said domain, is representative of a local model from said hierarchical collection and provides an approximate representation of said non-primitive pattern within said sub-domain;
the computer readable medium farther containing instructions to perform a plurality of steps comprising:
generating a plurality of descriptors wherein each of said descriptors specifies an estimated pattern representative of an instance of a model detected in said input signal;
storing said descriptors in a short-term memory;
extracting from said short-term memory a clique of descriptors which specifies a clique of estimated patterns;
selecting a model to be recognized from said hierarchical collection; and
generating, by using said clique of descriptors as auxiliary descriptors, a new descriptor that specifies a new pattern, wherein said new pattern has a fragmentation given by said clique of estimated patterns and is representative of an instance of said model to be recognized.

* * * * *